United States Patent
Futsuhara et al.

[19]

[11] Patent Number: 5,905,354
[45] Date of Patent: May 18, 1999

[54] MOTOR STOPPED VERIFICATION SENSOR

[75] Inventors: Koichi Futsuhara; Junpei Tajima; Toshihito Shirai, all of Urawa, Japan

[73] Assignee: The Nippon Signal Co., Ltd., Tokyo, Japan

[21] Appl. No.: 08/836,283

[22] PCT Filed: Sep. 12, 1996

[86] PCT No.: PCT/JP96/02614

§ 371 Date: May 9, 1997

§ 102(e) Date: May 9, 1997

[87] PCT Pub. No.: WO97/10512

PCT Pub. Date: Mar. 20, 1997

[30] Foreign Application Priority Data

Sep. 12, 1995 [JP] Japan .................................... 7-234330
Apr. 23, 1996 [JP] Japan .................................... 8-101099

[51] Int. Cl.[6] .................................................. G08B 21/00
[52] U.S. Cl. ......................... 318/700; 318/706; 318/799; 340/648
[58] Field of Search ................................. 318/700–715, 318/779, 780, 798–811, 434; 340/648

[56] References Cited

U.S. PATENT DOCUMENTS

| 3,976,919 | 8/1976 | Vandevier et al. ........................ 361/96 |
| 4,520,300 | 5/1985 | Fradella .................................... 318/603 |
| 4,661,880 | 4/1987 | Futsuhara . | |
| 4,757,417 | 7/1988 | Futsuhara . | |
| 5,027,114 | 6/1991 | Kawashima et al. . | |
| 5,337,206 | 8/1994 | Kadah et al. ............................... 361/85 |
| 5,561,358 | 10/1996 | Kuwabara et al. ...................... 318/799 |
| 5,568,059 | 10/1996 | Futsuhara et al. ...................... 324/772 |
| 5,568,131 | 10/1996 | Sakai et al. ............................. 340/648 |
| 5,677,606 | 10/1997 | Otake ...................................... 318/434 |
| 5,706,153 | 1/1998 | Innes et al. ............................... 361/31 |

FOREIGN PATENT DOCUMENTS

| 0247994 | 5/1987 | European Pat. Off. . |
| 2208673 | 2/1972 | Germany . |
| 58-11865 | 1/1983 | Japan . |
| WO 94/23303 | 10/1994 | WIPO . |
| WO94/23496 | 10/1994 | WIPO . |
| WO96/31755 | 10/1996 | WIPO . |

*Primary Examiner*—Brian Sircus
*Attorney, Agent, or Firm*—Finnegan, Henderson, Farabow, Garrett & Dunner, L.L.P.

[57] ABSTRACT

The present invention relates to a sensor for verifying that a motor has stopped rotating including rotation due to inertia.

Respective signal input lines are connected to three power supply lines of a three phase AC motor. A high frequency signal current is supplied to one of the power supply lines, and the difference in the current flowing in the other two power supply lines is sampled from the signal input lines connected to the two power supply lines, and made an output from a sensor section. The sensor output is subjected to a threshold value operation in a signal processing circuit, and the resultant threshold operation output is output from an on-delay circuit as a motor rotation presence judgment output.

28 Claims, 32 Drawing Sheets

MOTOR STOPPED VERIFICATION SENSOR

TECHNICAL FIELD

The present invention relates to a sensor for verifying that a three phase AC motor has stopped rotating, and in particular to sensor technology for also verifying that rotation of the motor due to inertia has stopped after shutting off the motor power source.

BACKGROUND ART

As a sensor for verifying that a motor has stopped rotating, there is, for example one, which uses an electromagnetic pickup (refer to PCT Publication No. WO94/23303 (PCT/JP93/00411)).

With this device, a metal disc having a plurality of metallic protrusions located at even spacing around the surface periphery thereof is secured to a motor rotation shaft, and an electromagnetic pick up, serving as a sensor head, is provided at a location facing the protrusions at a predetermined distance therefrom. When the metal disc rotates with rotation of the motor, fluctuations are produced in a magnetic flux with the passing of the respective protrusion. By subjecting the resultant fluctuations in the output from the electromagnetic pick up, due to these magnetic flux fluctuations, to threshold value processing or the like, using a signal processing circuit, then during rotation of the motor (including rotation under inertia), an output of logic value 0 showing that the motor is rotating (danger side) is produced from the signal processing circuit, while when the motor rotation has practically stopped (safe side), an output of logic value 1 is produced from the signal processing circuit.

However, in devices which use an electromagnetic pickup for the sensor head, the spacing between the protrusions and the electromagnetic pick up is extremely small. Moreover, this spacing must be controlled very accurately. Therefore, the sensor head attachment operation becomes difficult. Furthermore, there is a problem in that the fitted location of the pickup head and related parts must be periodically checked, thus increasing maintenance and inspection costs.

Moreover, the circuit configuration for prohibiting generation of a motor stopped judgment output, for the period including from after shutting off the motor power source until motor rotation under inertia has reduced to a sufficiently slow speed is complicated.

The present invention takes into consideration the above-mentioned situation, with the object of providing a motor stopped verification sensor which does not have an electromagnetic pickup type sensor head, thus obviating the need for control of the attachment position, and hence the attachment operation is extremely simple.

SUMMARY OF THE INVENTION

Accordingly, with the motor stopped verification sensor according to the present invention the construction comprises: a sensor section having three signal input lines for respectively connecting to three power supply lines of a three phase AC motor, the three signal input lines being connected such that a closed circuit is made up with one of the three power supply lines as a common power supply line, and the other two power supply lines connected together in parallel, and a high frequency signal of a lower level than the level of a motor drive power source is supplied to the closed circuit from the signal input line connected to the common power supply line, and a difference in the value of the currents respectively flowing in the other two signal input lines is sampled to determine whether to output a motor stopped signal or a motor rotating signal.

With such a construction, there is no sensor head as with the electromagnetic pickup type, thus obviating the need for control of the attachment position. Hence sensor attachment is extremely simple.

Moreover the construction includes provision of: a signal processing circuit for generating an output of logic value 1 corresponding to a high energy condition when a level of a signal sampled by the sensor section is within a predetermined range, and generating an output of logic value 0 corresponding to a low energy condition when outside the predetermined range; and a first on-delay circuit for delaying the output of logic value 1 from the signal processing circuit for a predetermined time, and an output of logic value 1 from the on-delay circuit is made a motor stopped judgment output, and an output of logic value 0 from the on-delay circuit is made a judgment output indicating motor rotation, or a sensor fault.

With such a construction, only when the motor rotation is stopped is an output signal of logic value 1 corresponding to the high energy condition produced, thus enabling a fail-safe construction.

Furthermore, the construction may incorporate a first switching device linked to an ON operation of an operating switch for the motor, for shutting off a drive power source for the first on-delay circuit.

With such a construction, a motor stopped judgment output is never produced when power is being supplied to the motor.

Moreover, such construction may further include a pulley belt for transmitting rotation of the motor to the load, and a pulley belt presence detection sensor which generates an output of logic value 1 when the pulley belt is normal and which generates an output of logic value 0 when the pulley belt is broken; and a second switching device for shutting off a drive power source for the first on-delay circuit when an output from the pulley belt presence detection sensor is a logic value 0.

With such a construction, in the case for example where the pulley belt breaks after shutting off the motor power source, then if the inertia of the load is significant the load can continue to rotate. However in such a situation, when the pulley belt breaks a judgment output from the on-delay circuit indicating that motor rotation has stopped can be forcibly suppressed.

Furthermore the construction may be such that there is respectively provided current sensors in at least two of the three power supply lines to the motor, which give an output of logic value 1 when a motor drive current does not flow and which give an output of logic value 0 when a motor drive current does flow and there is provided a first logical product operating device for carrying out a logical product operation on the outputs from the respective current sensors and the output from the first on-delay circuit, and an output of logic value 1 from the first logical product operating device is made a motor stopped judgment output, and an output of logic value 0 is made a judgment output indicating motor rotation or a sensor fault.

With such a construction, a motor stopped judgment output is never produced when power is being supplied to the motor.

The pulley belt presence detection sensor may use a reflection type optical sensor which projects a light beam from a projector towards the pulley belt, and generates an output of logic value 1 when the reflected light is received by a light receiver.

With such a construction, when for example the projector malfunctions so that projection of the light beam ceases, the output from the pulley belt presence detection sensor becomes a logic value 0, and hence danger can be advised.

Furthermore, the construction may be such that there is provided respective first switching elements disposed respectively in series in the three power supply lines, and respective second switching elements disposed respectively in series in at least the signal input lines connected to the other two power supply lines, as well as a switching element control device for on/off drive of the first switching elements and the second switching elements in a relationship such that, generally, when the first switching elements are switched on, the second switching elements are switched off.

With such a construction, then at the time of motor power supply, the sensor section and the motor power source system can be reliably insulated. Therefore even if a high frequency power source such as an inverter power source is used for the motor power source, there is no call for an increase in size and cost of the elements of the sensor section.

Moreover, the construction may be such that there is provided a second on-delay circuit which delays the switching on of the second switching elements for a predetermined time, when the first switching elements are switched off.

With such a construction, the sensor section is connected to the motor power source system after a predetermined delay time from interruption of the motor power supply. Therefore, even in the case where power is stored in the motor immediately after interrupting the motor power supply, the transmission of the power to the sensor section can be prevented.

Furthermore, the construction may be such that there is provided: an OFF fault detection device which gives an output of logic value 1 when the second switching elements are normal, and which gives an output of logic value 0 at the time of an OFF fault; and a second logical product operating device for carrying out a logical product operation on an output from the OFF fault detection device and an output from the first on-delay circuit, and an output of logic value 1 from the second logical product operating device is made a motor stopped judgment output.

With such a construction, even in the case of an OFF fault in the second switching elements, a motor stopped judgment output will not be produced.

The first and second switching elements may basically comprise electromagnetic relays or semiconductor relays (contactless relays). In the case of electromagnetic relays, the second switching elements may use a forced operation type electromagnetic relay. In this case, by using excitation contact points for the second switching elements, and assembling non excitation contact points having a complementary relationship with the excitation contact points into a switching element control device, then if a fusion fault occurs in the excitation contact points, when the motor power source has once gone OFF, subsequent power supply to the motor can be prevented.

Moreover, the construction may comprise: a rotation present detection circuit which generates an output signal of a high level when, based on an output signal from the sensor section of a frequency corresponding to motor rpm, the frequency is higher than a predetermined value; a low speed rotation detection circuit which generates an output signal of a high level when a frequency of the output signal from the sensor section is equal to or less than the predetermined value; and a rotation stopped judgment circuit which generates an output signal of a high level indicating that rotation has stopped, under conditions where there is a period where output signals of a high level are simultaneously generated from both detection circuits.

Figure 1:
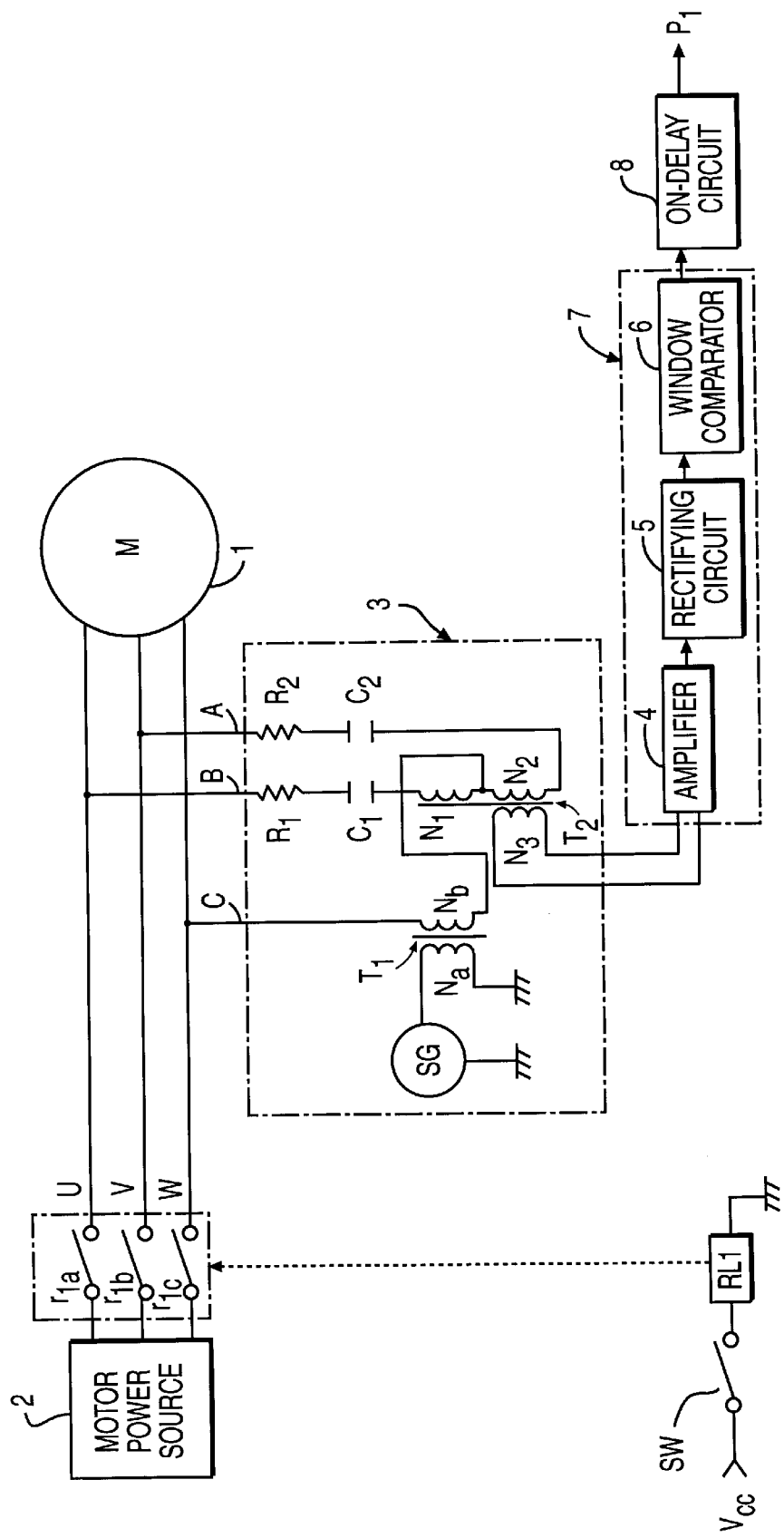
FIG. 1 is a circuit diagram of a first embodiment of a motor stopped verification sensor according to the present invention.
Figure 3:
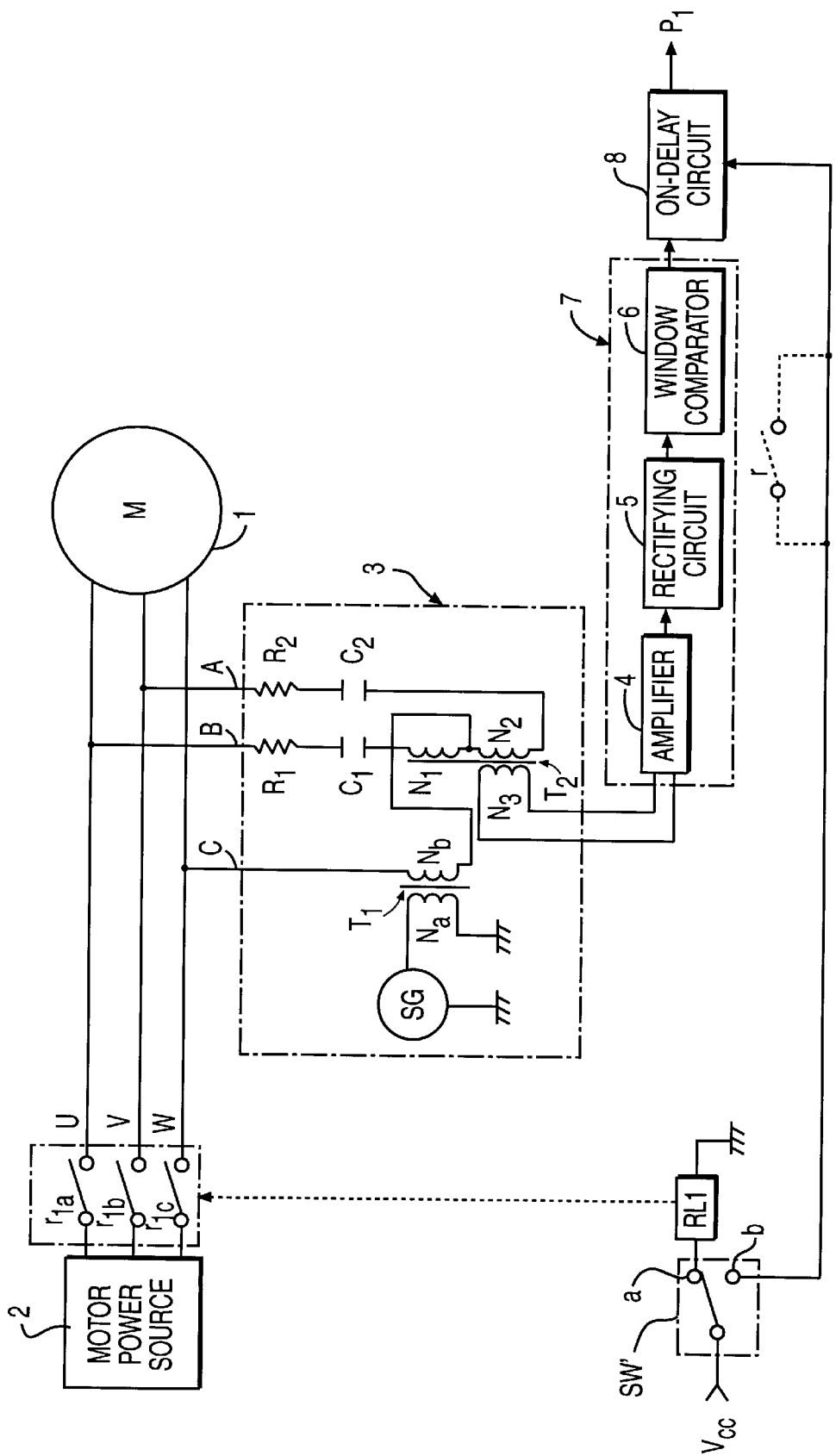
FIG. 3 is a circuit diagram of a second embodiment of the present invention.
Figure 4:
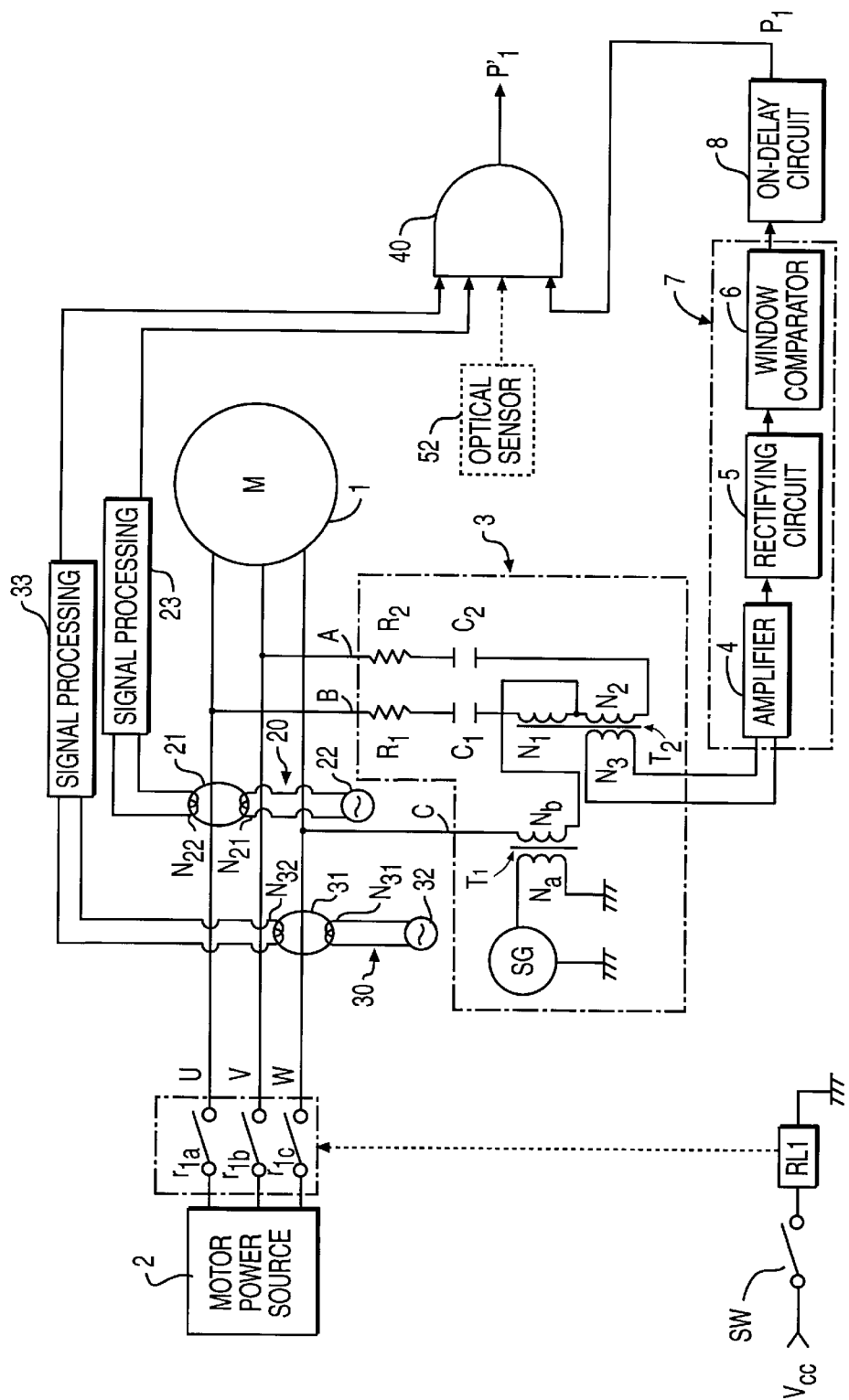
FIG. 4 is a circuit diagram of a third embodiment of the present invention.
Figure 8:
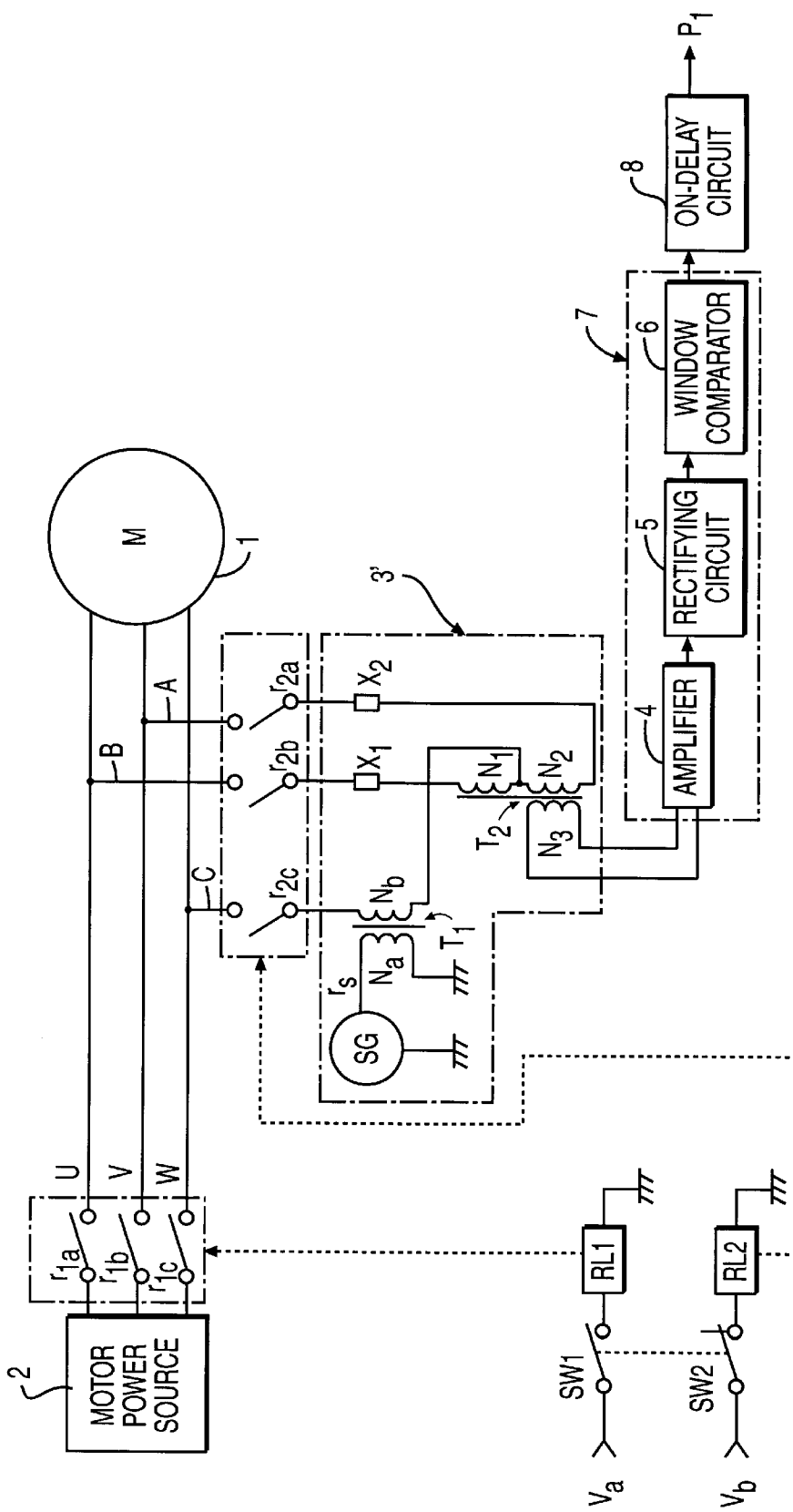
FIG. 8 is a circuit diagram of an embodiment suited to the case where a high frequency motor power source is used.
Figure 10A:
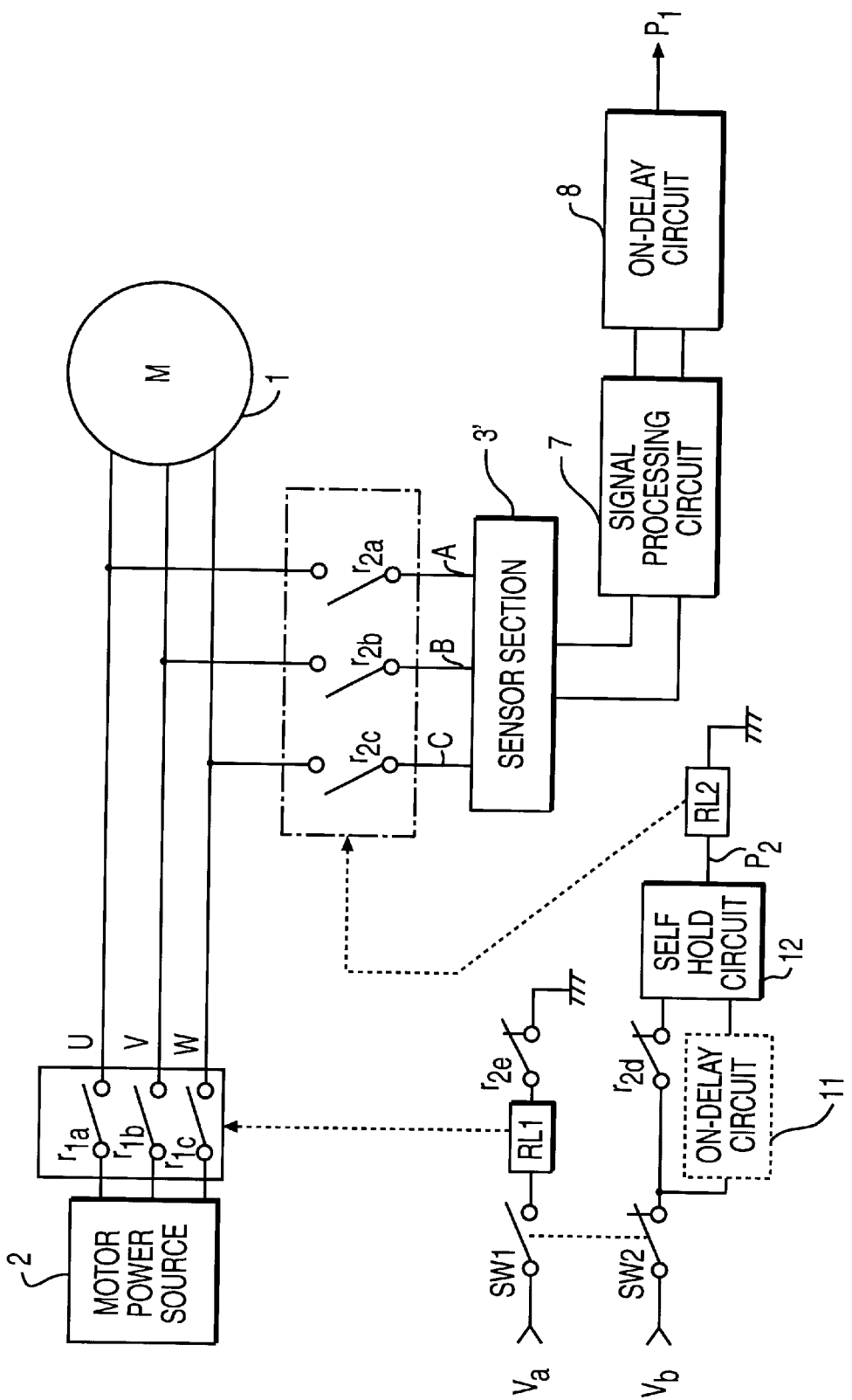
Figure 10B:
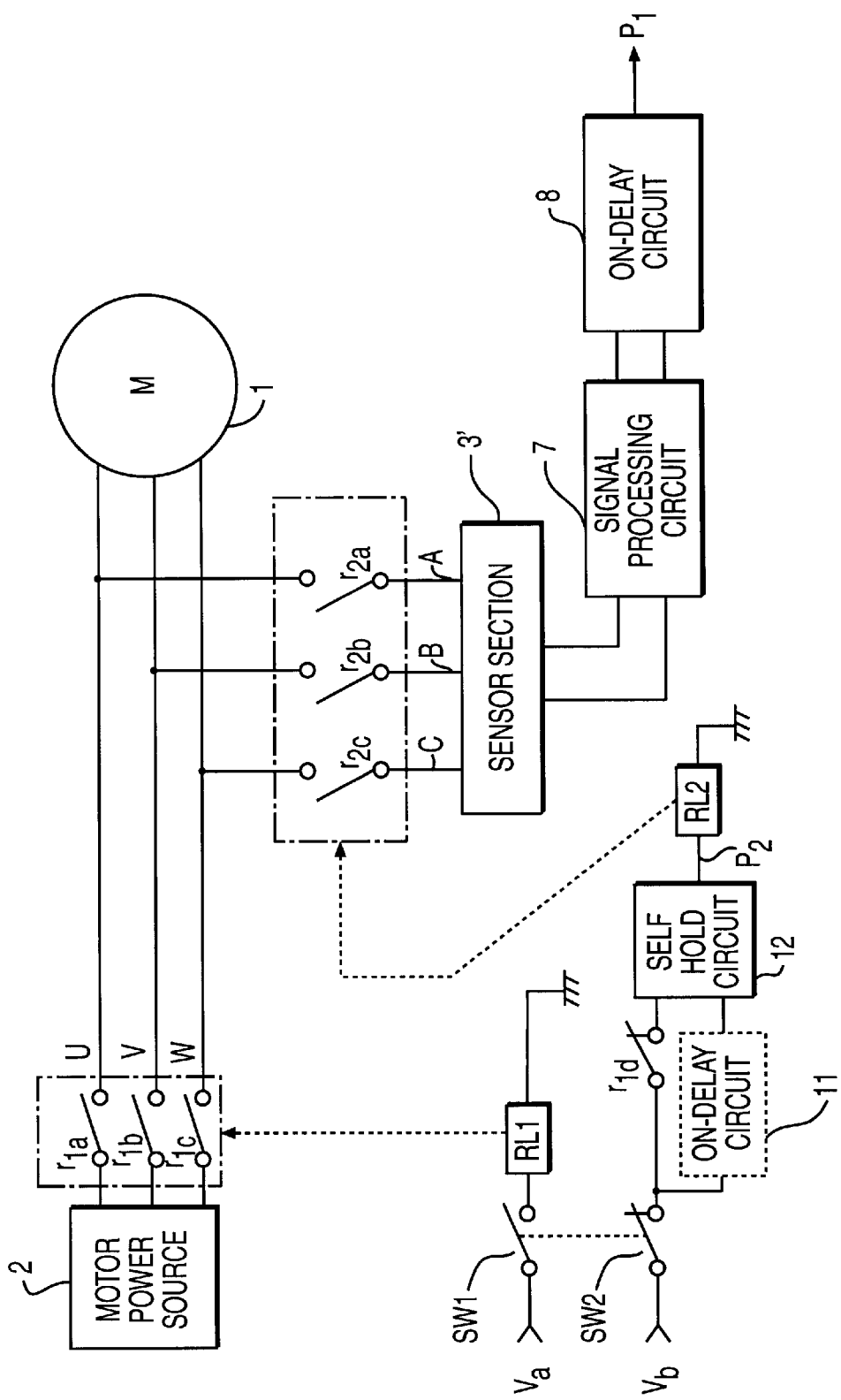
Figure 10C:
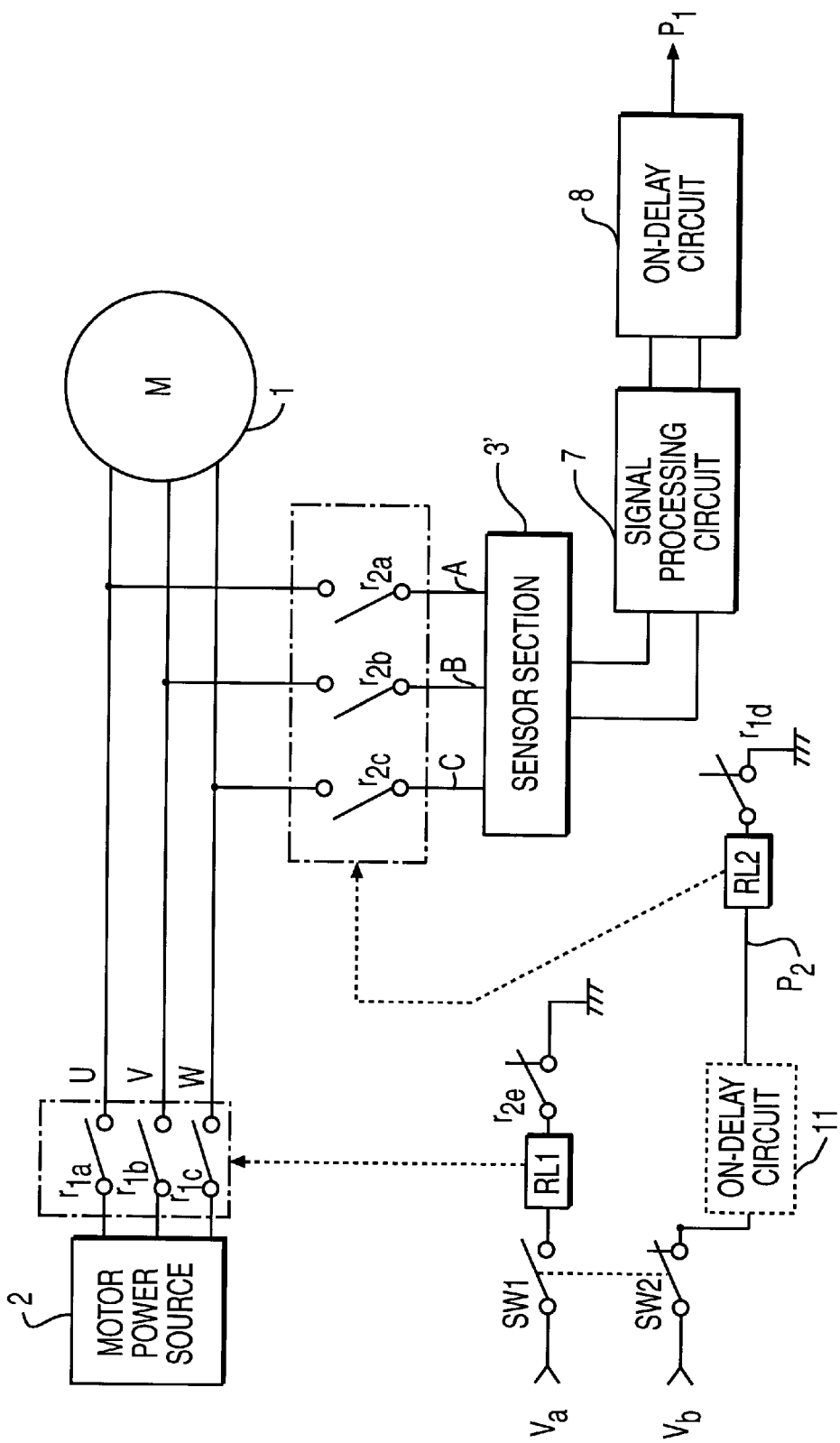
Figure 10D:
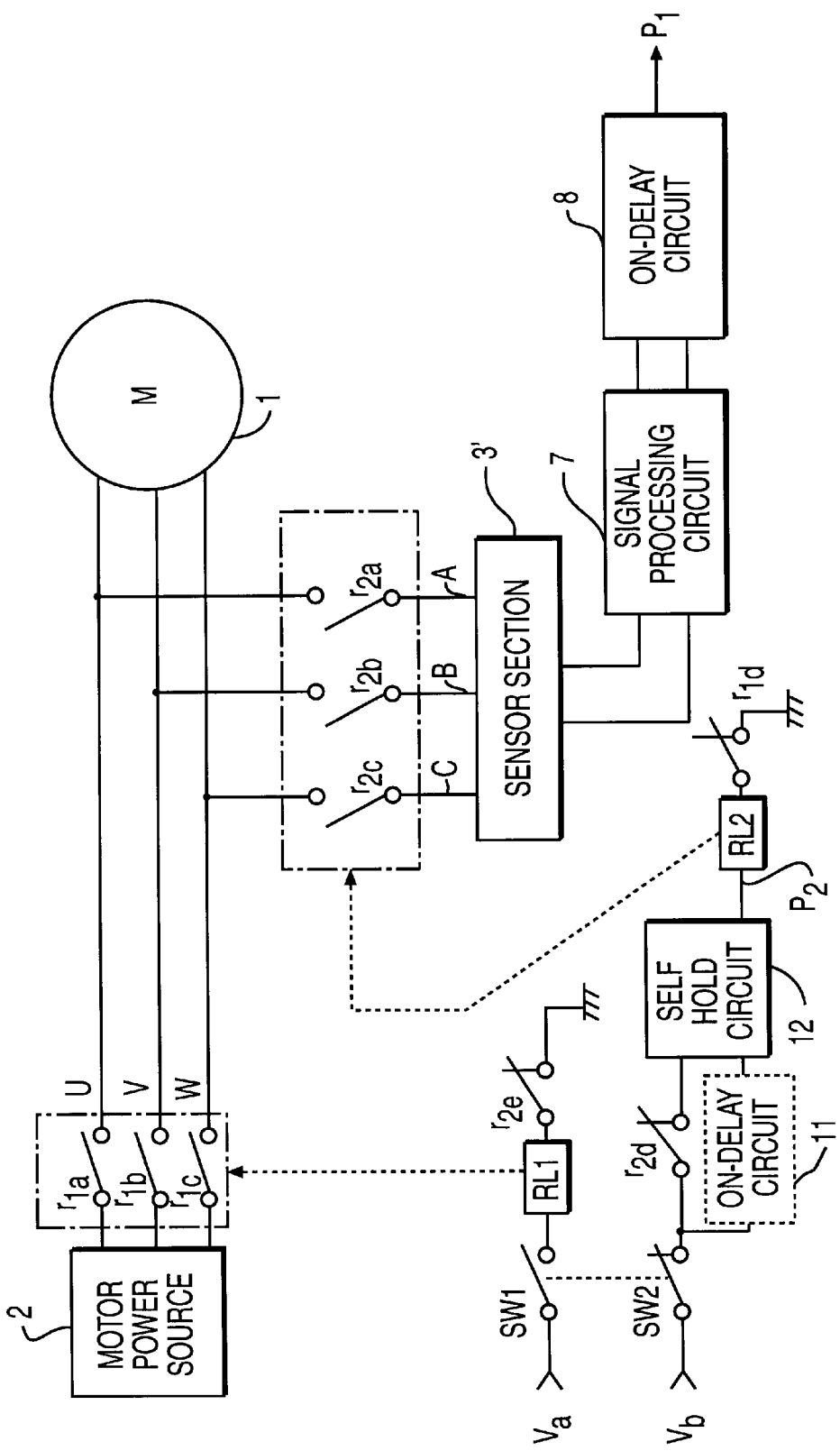
Figure 11:
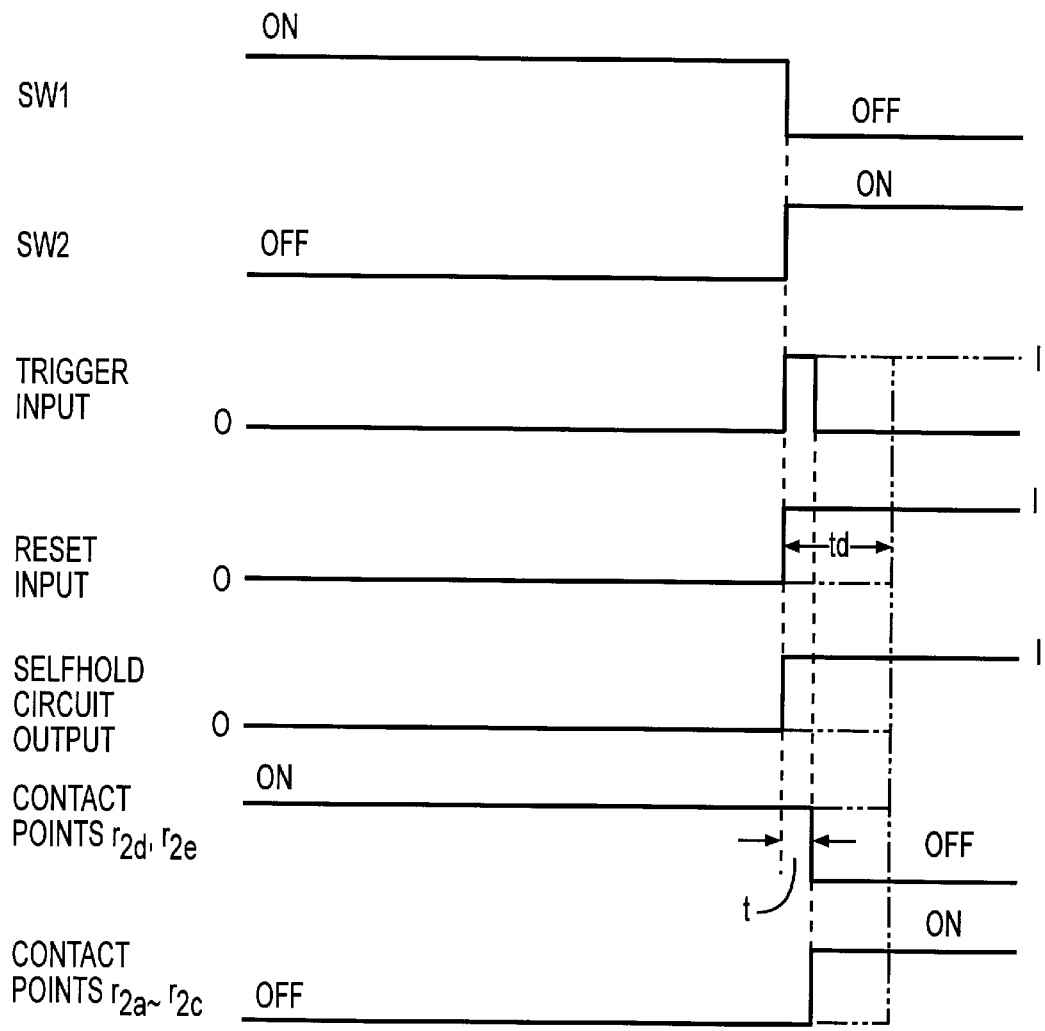
Figure 12:
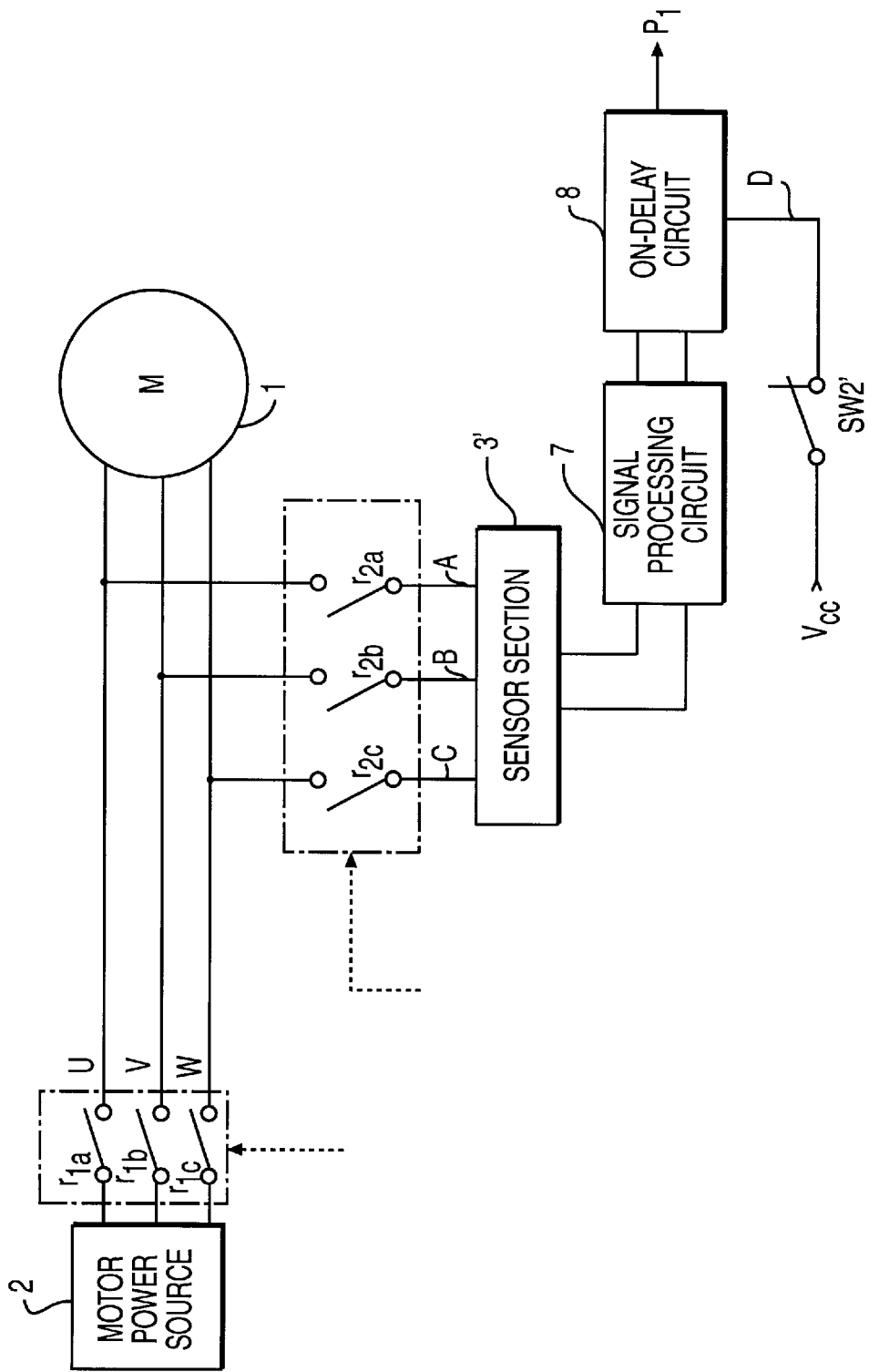
Figure 13:
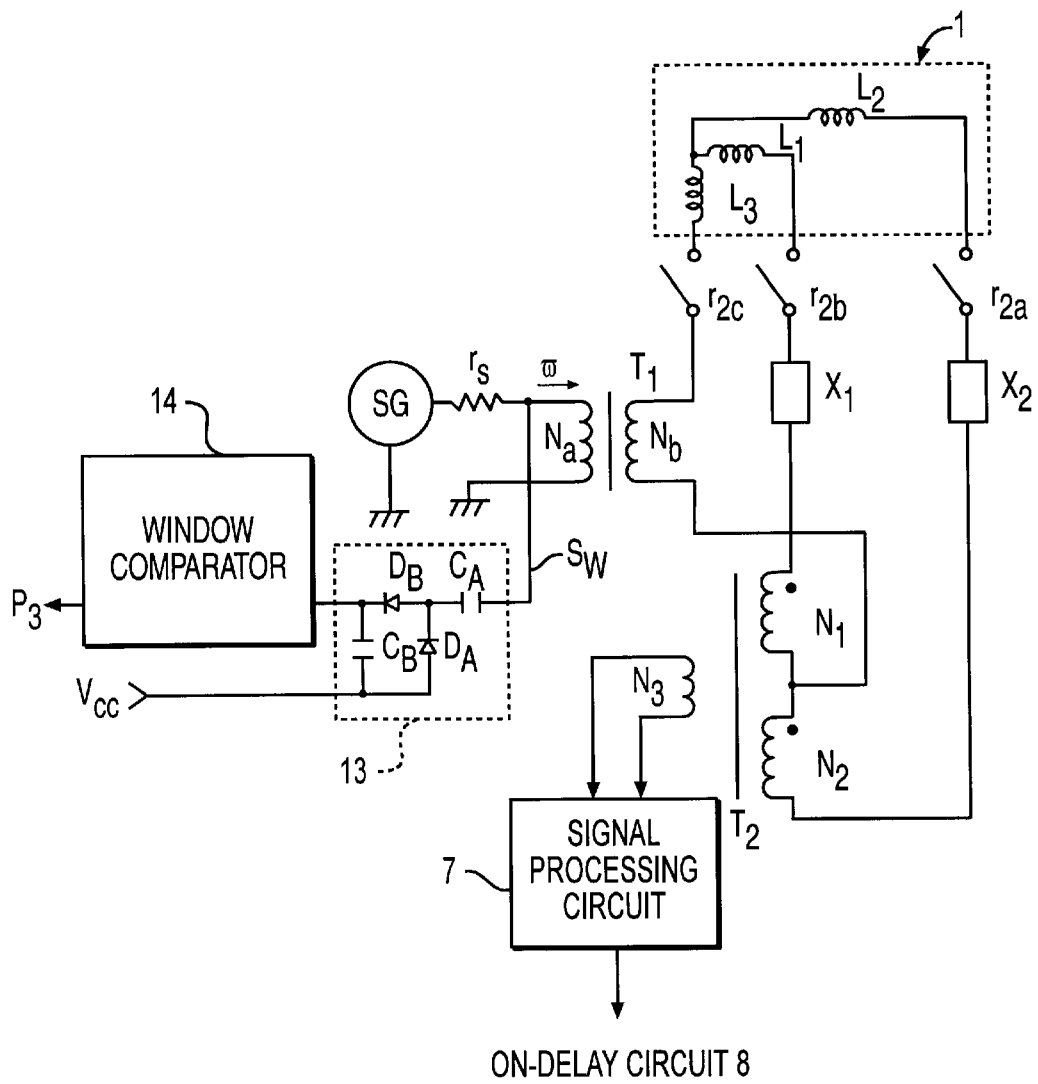
Figure 14A:
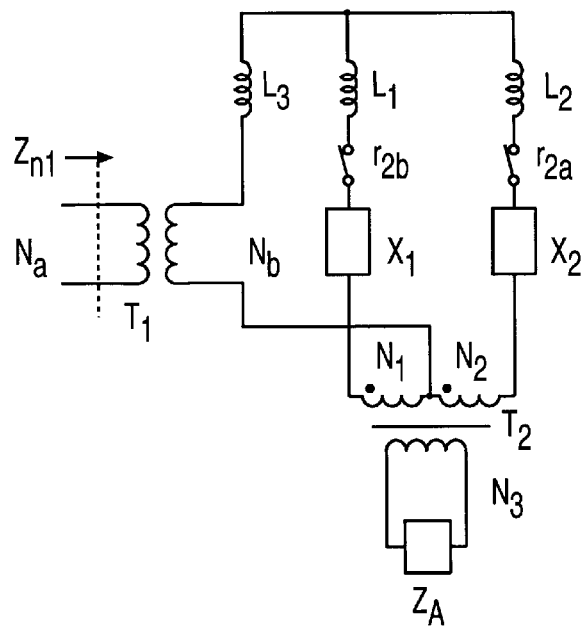
Figure 14B:
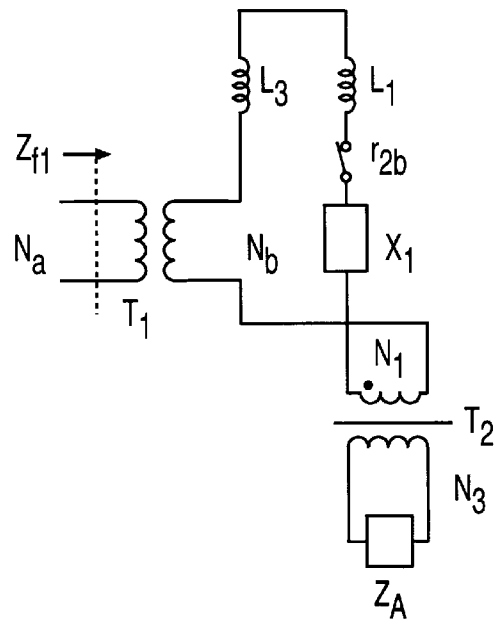
Figure 15:
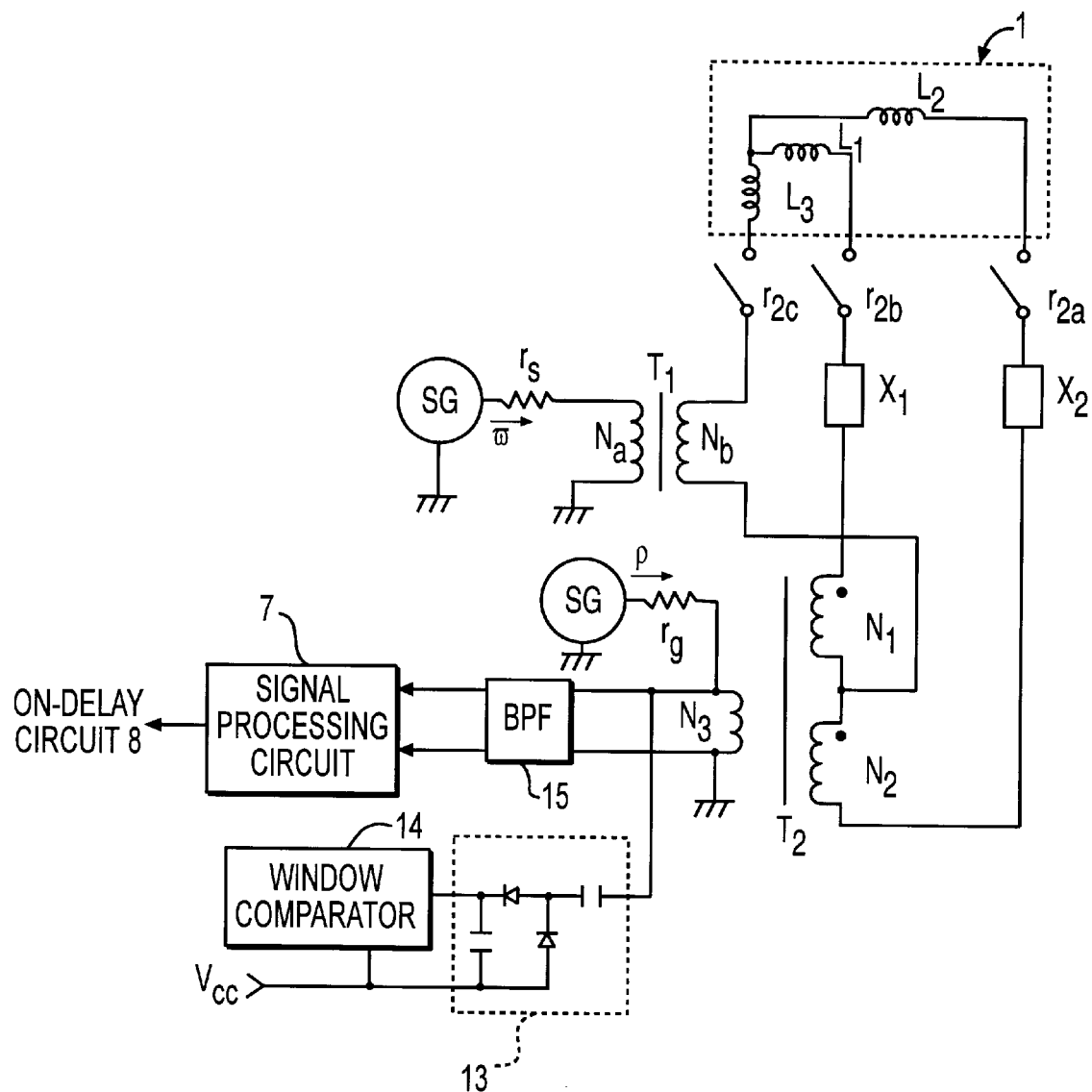
Figure 16A:
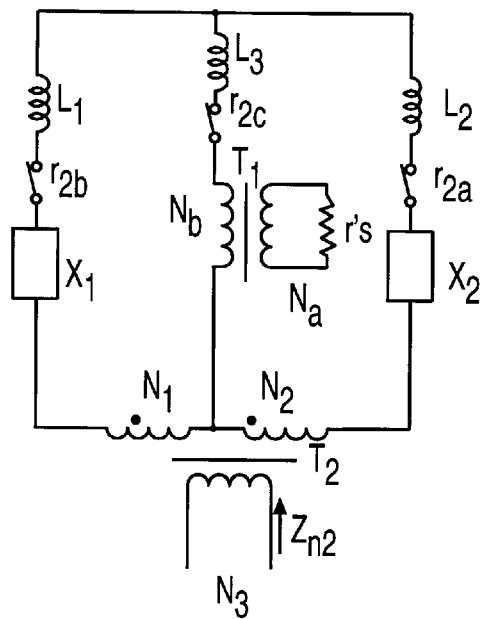
Figure 16B:
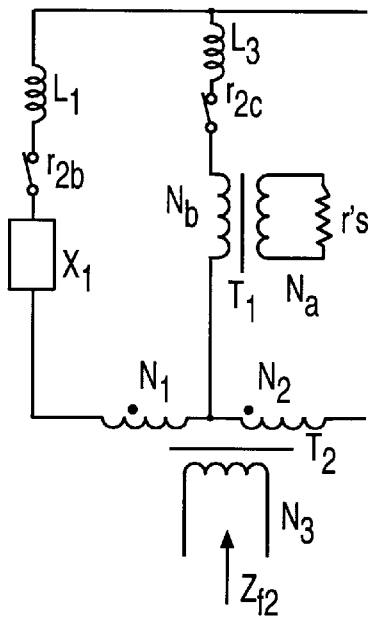
Figure 17:
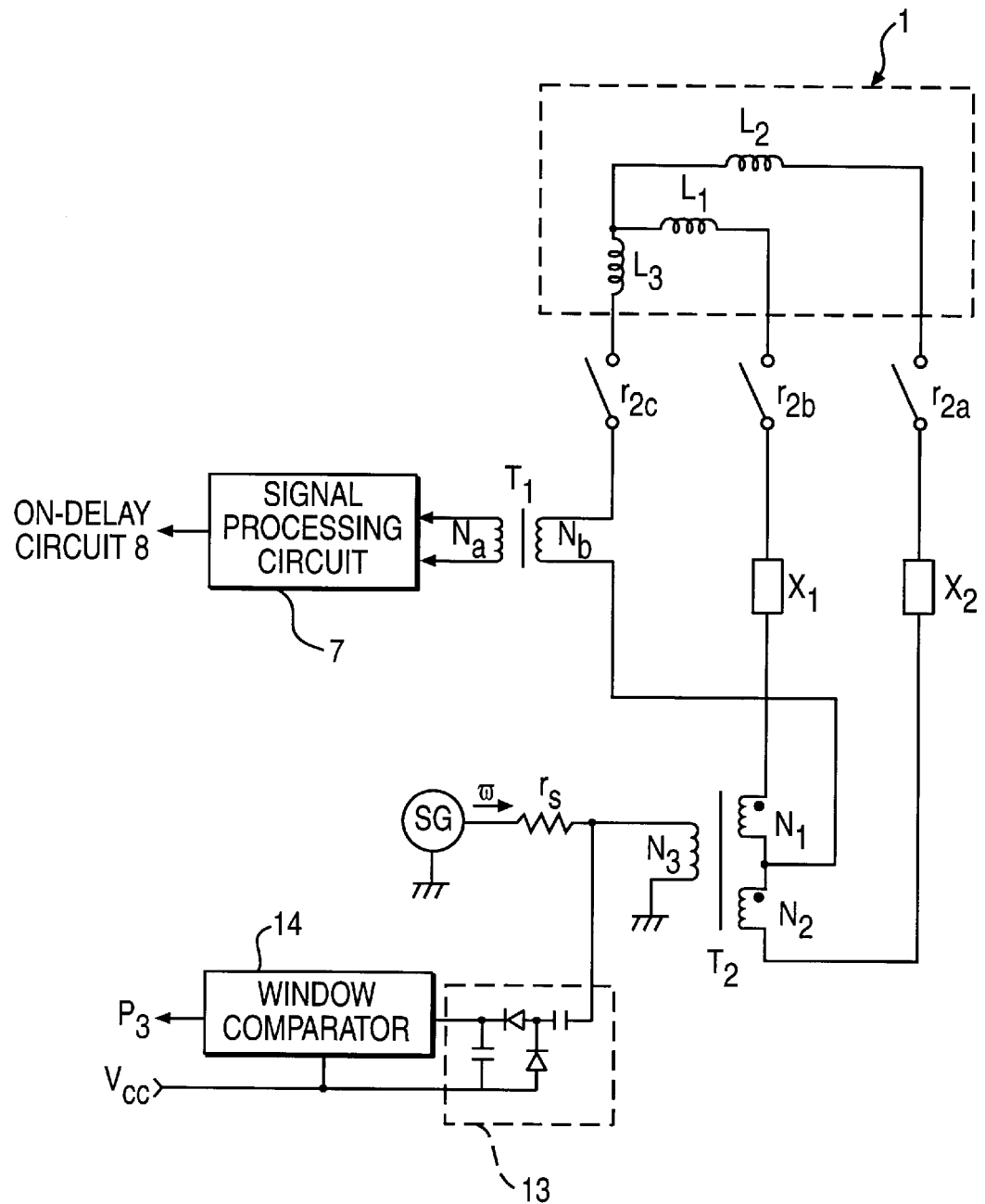
Figure 18A:
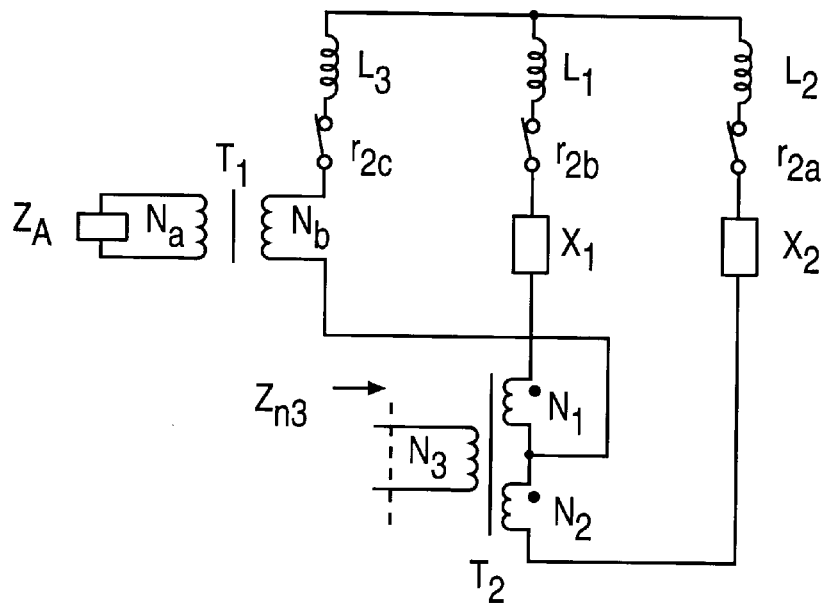
Figure 18B:
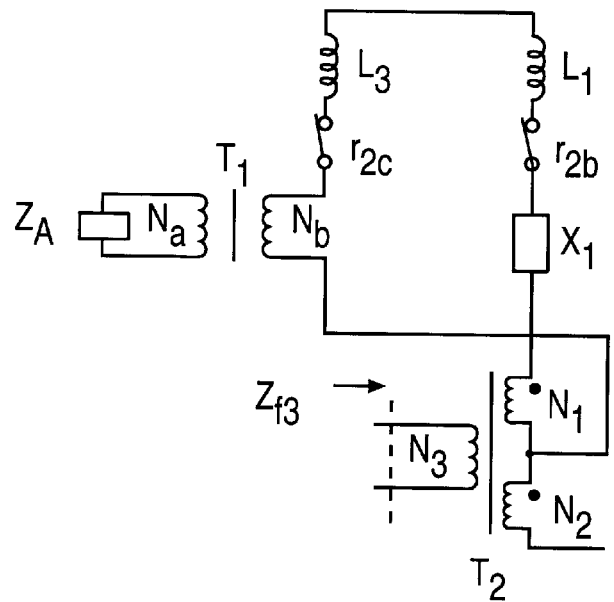
Figure 19:
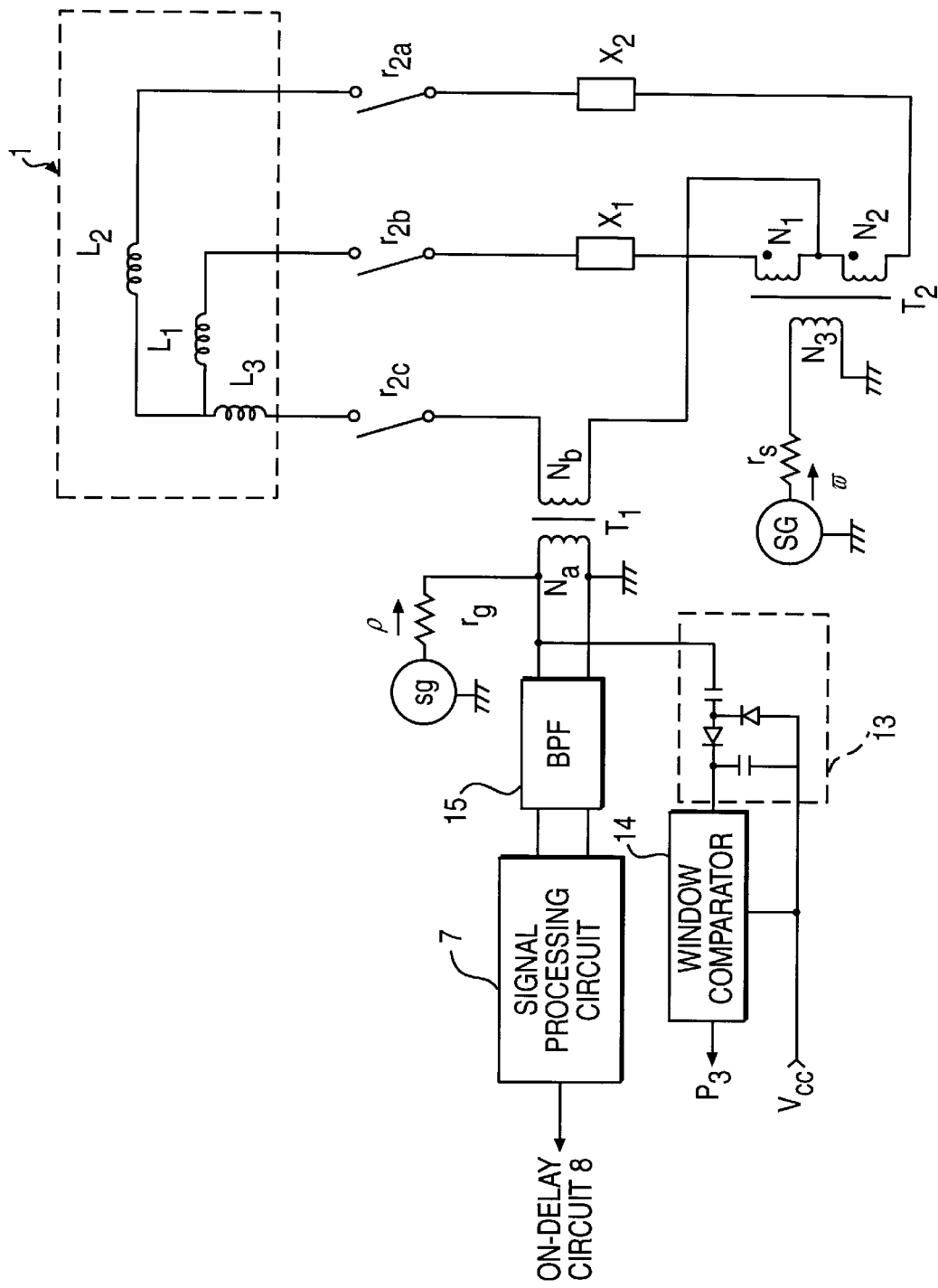
Figure 20A:
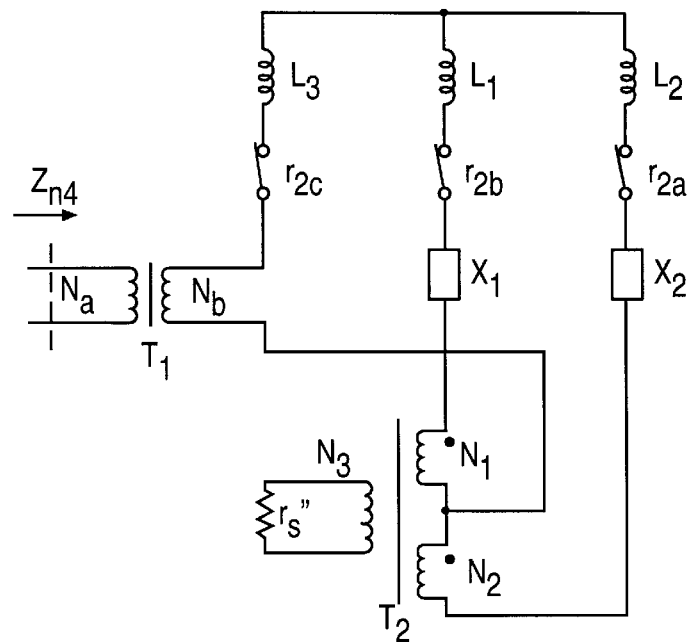
Figure 20B:
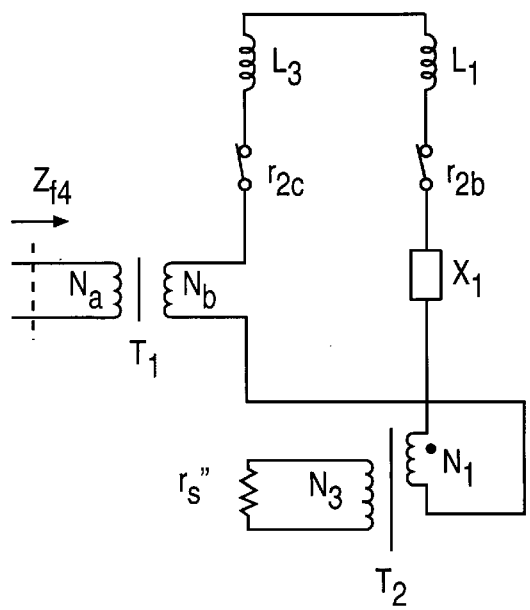
Figure 21:
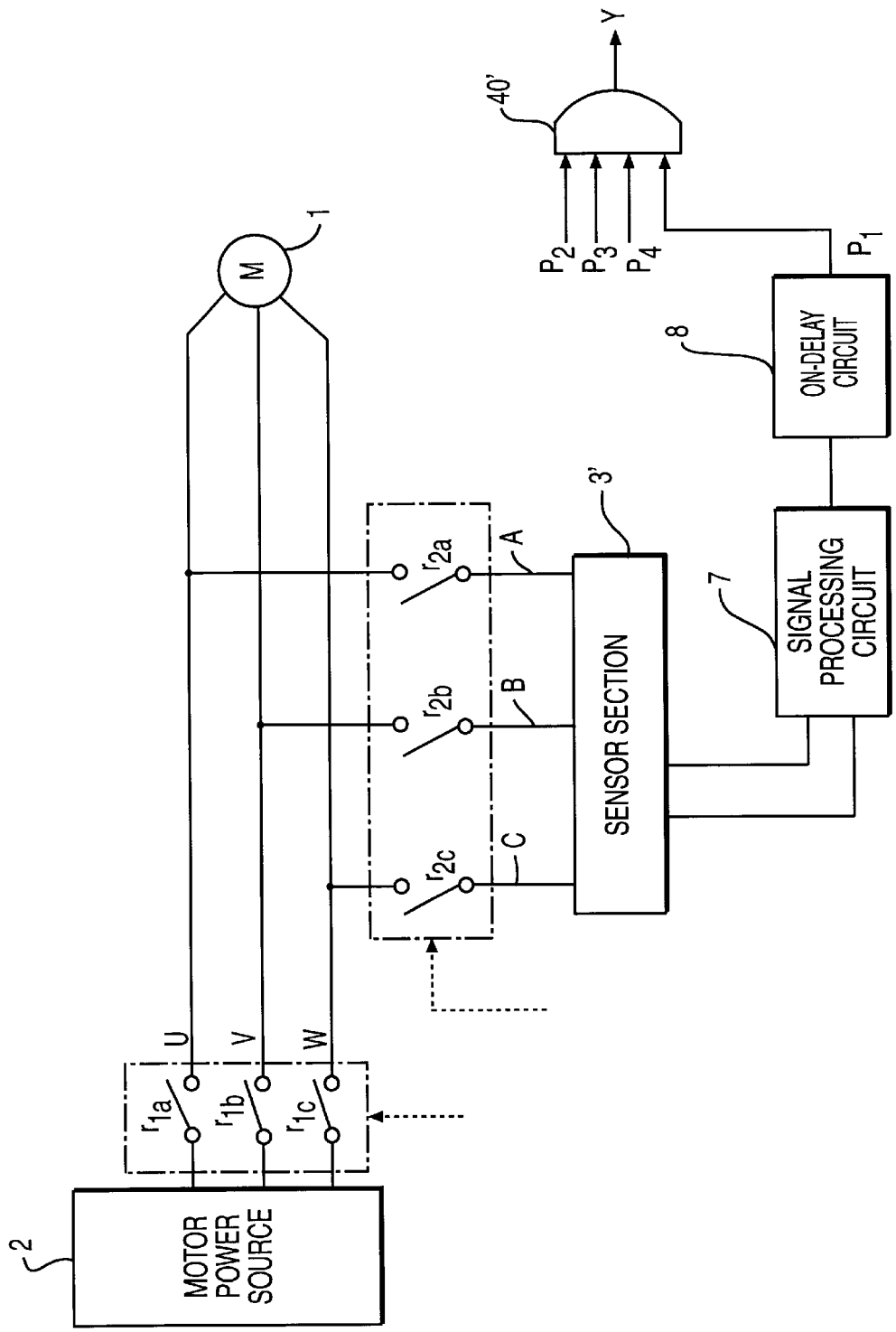
Figure 22:
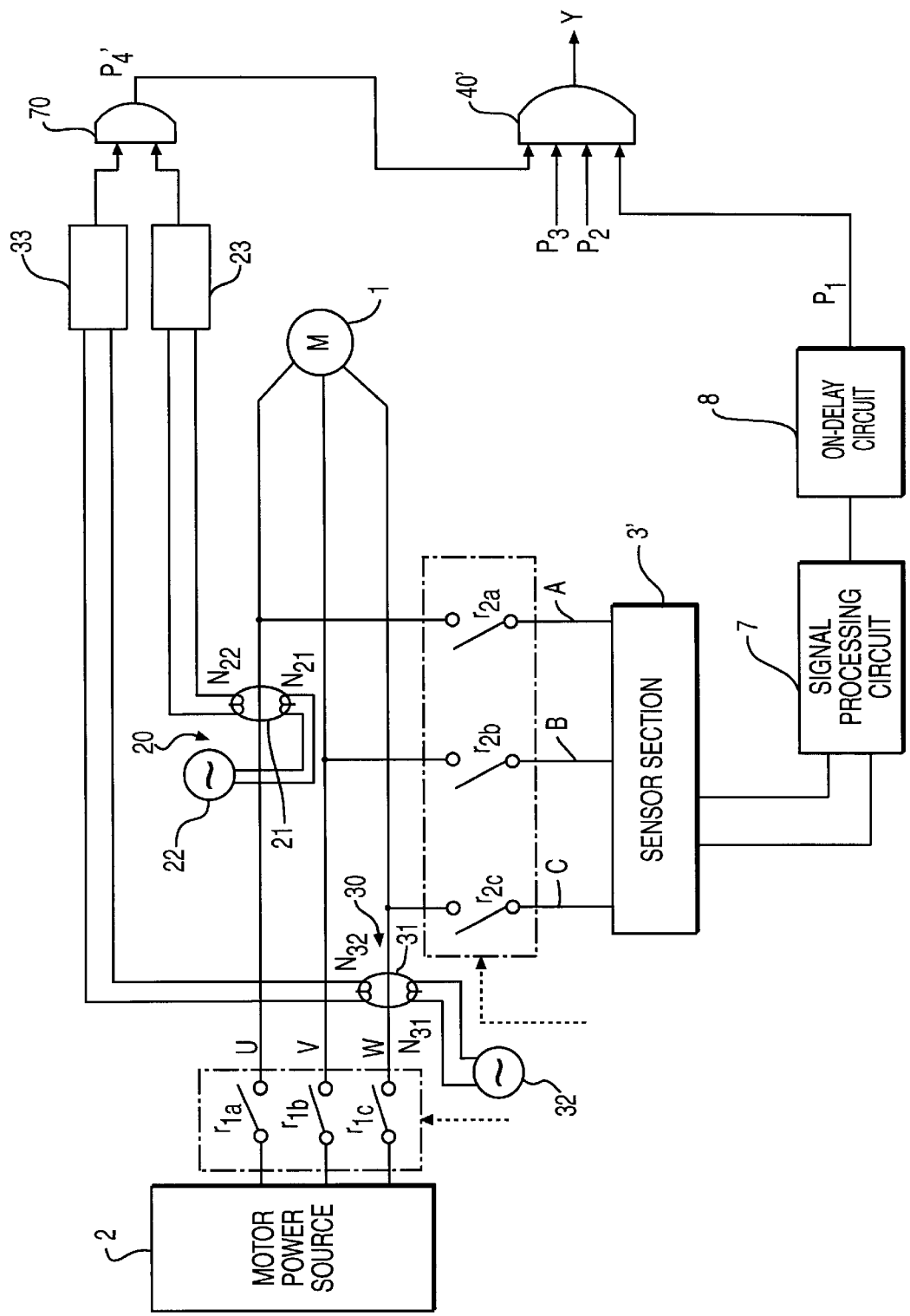
Figure 23:
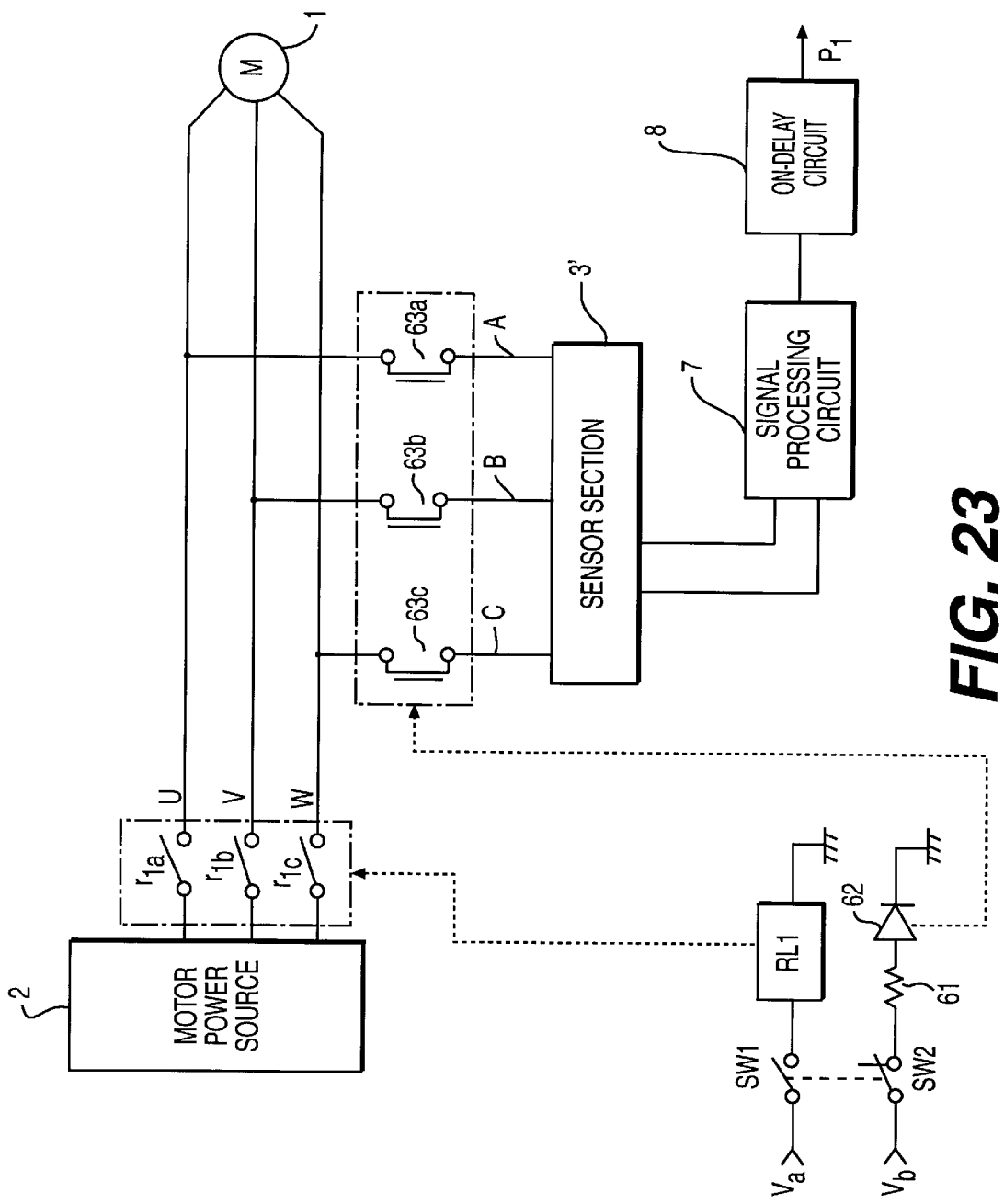
Figure 24:
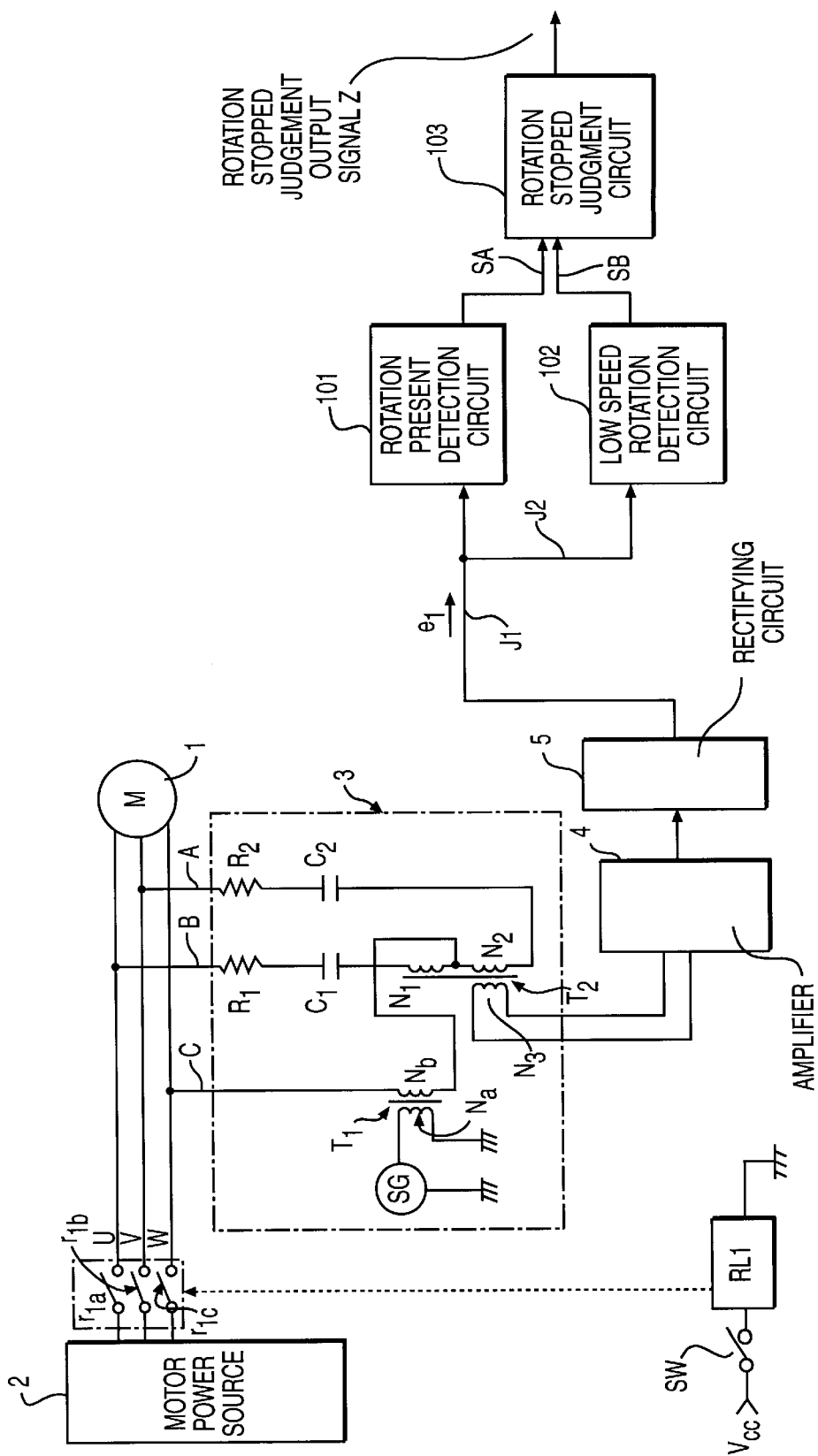
Figure 25:
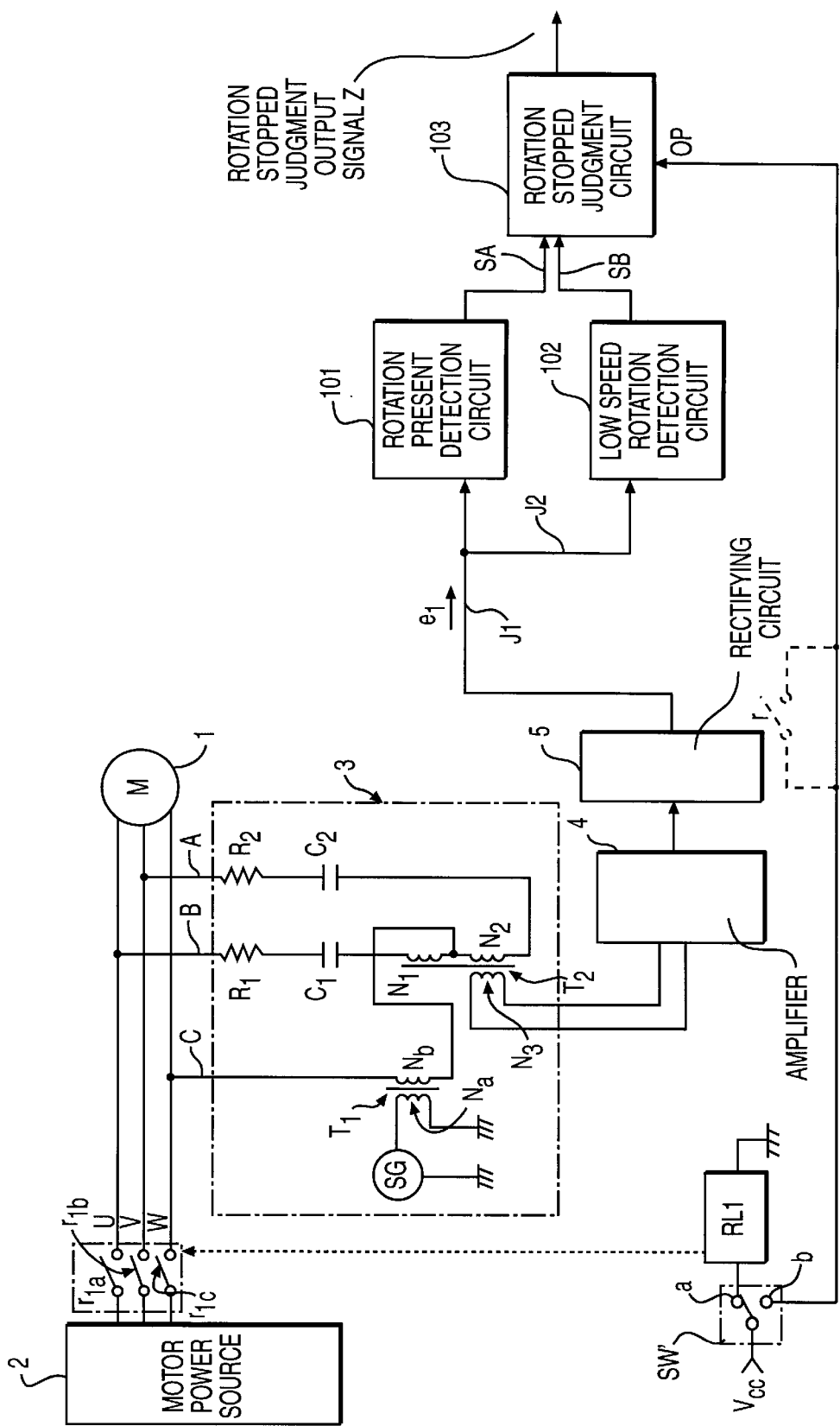
Figure 26:
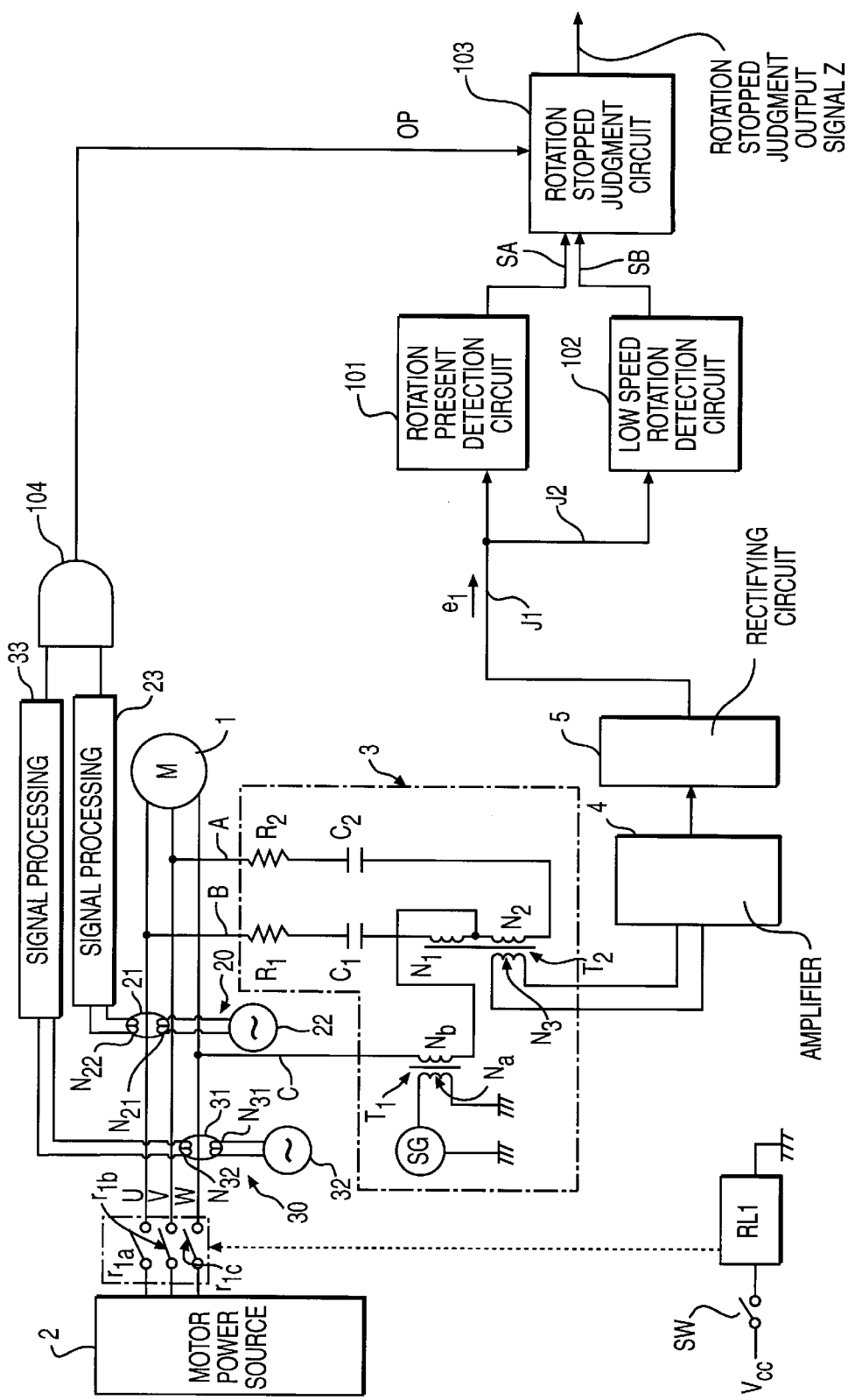
Figure 27:
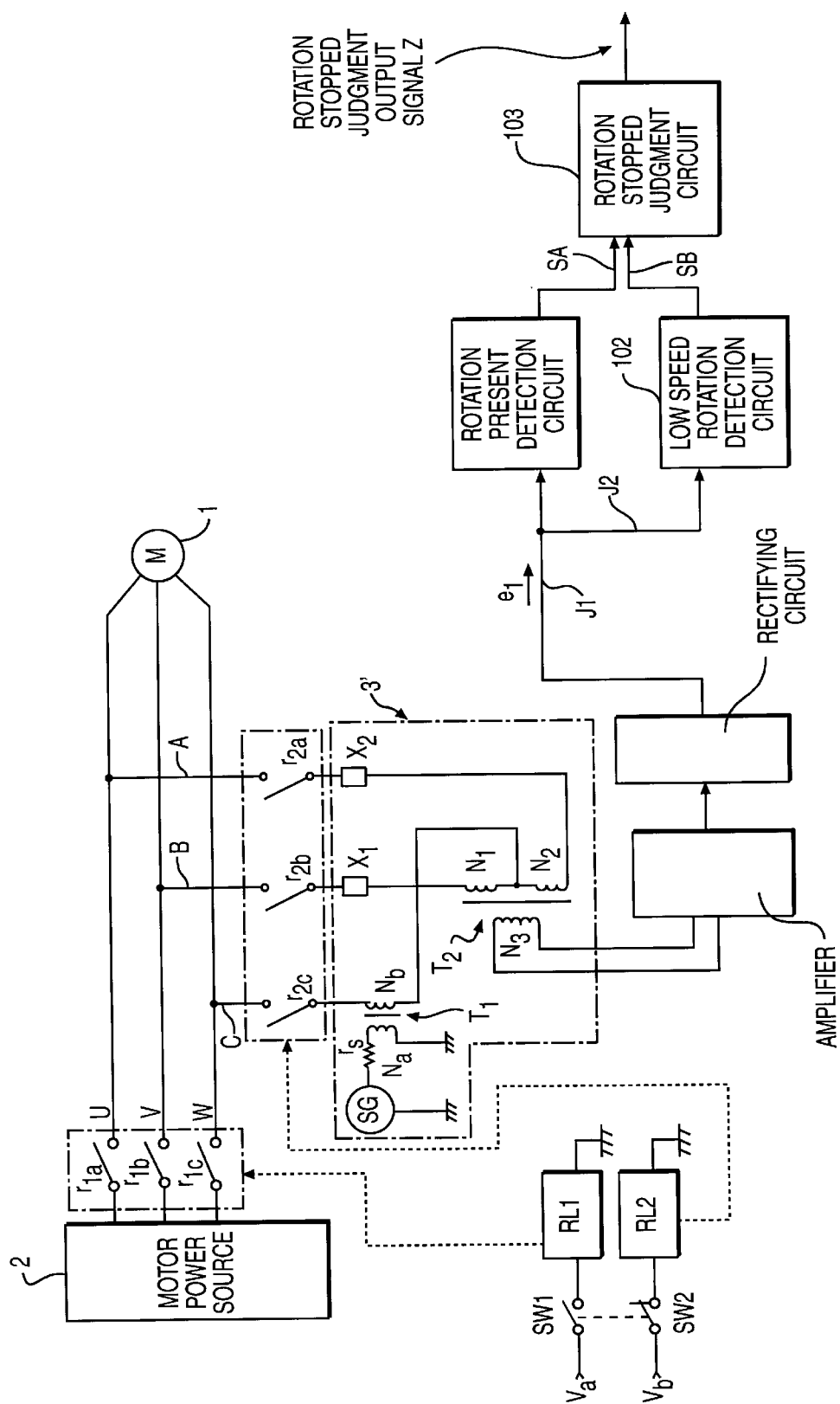
Figure 28:
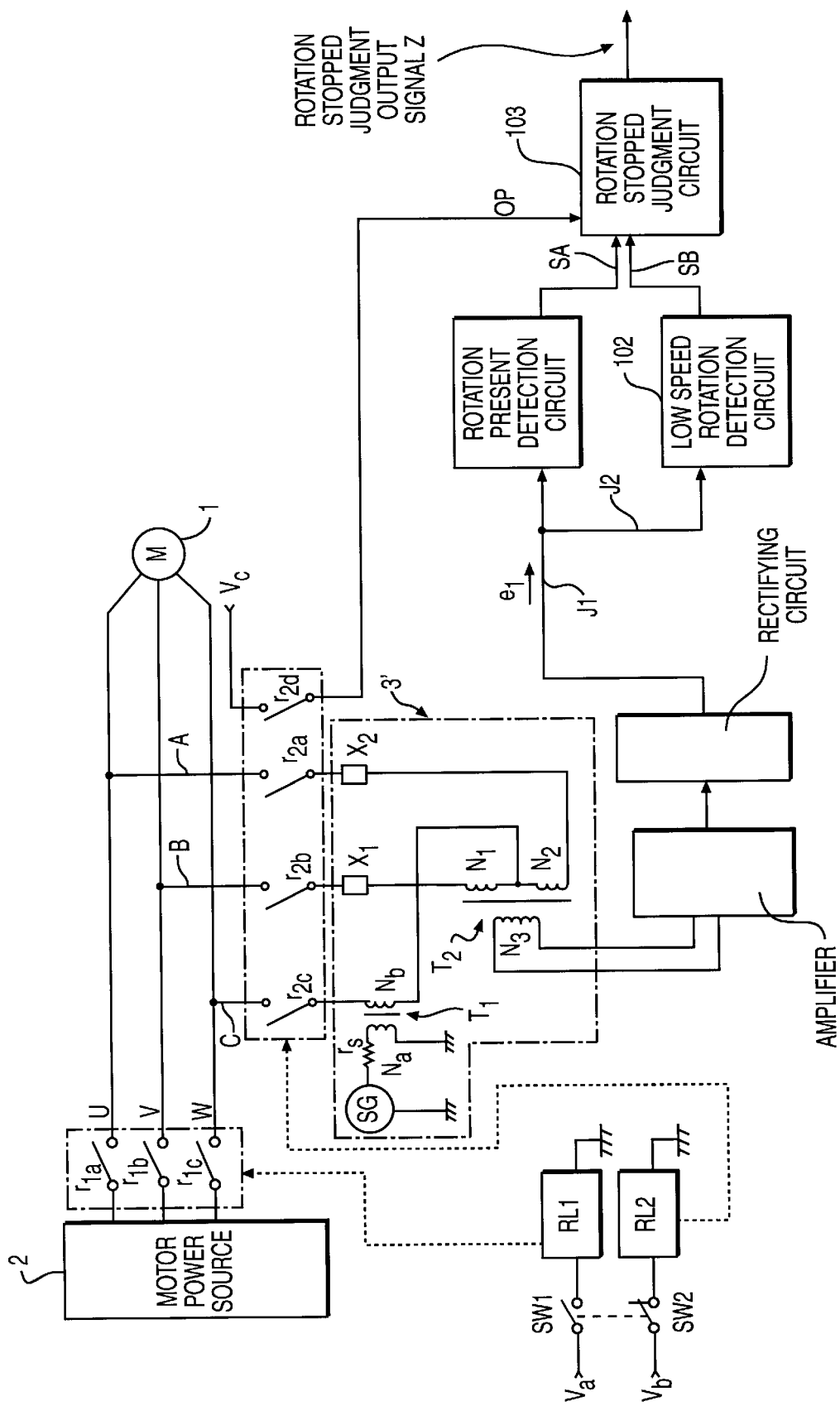
Figure 29:
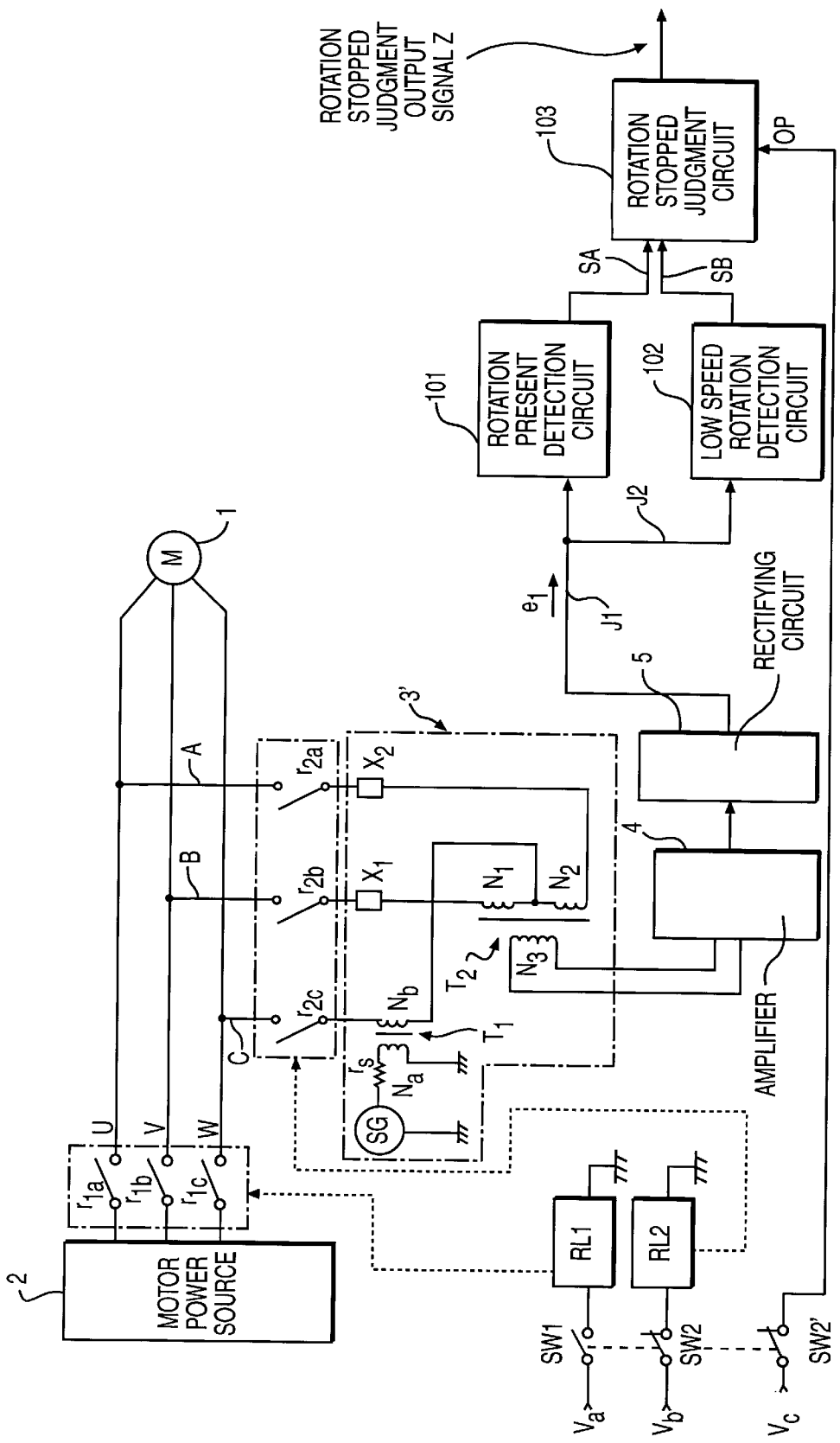
Figure 30:
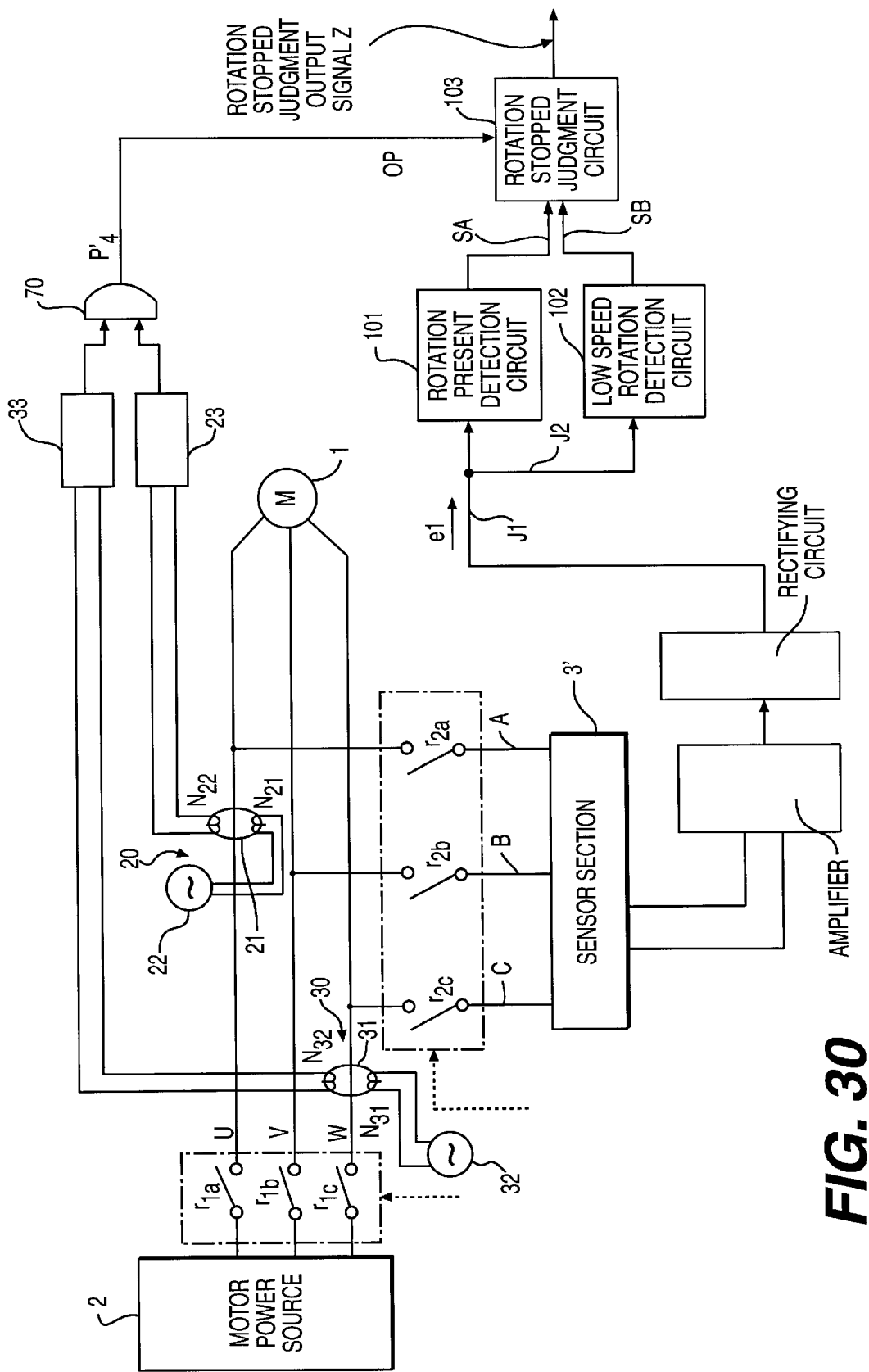
Figure 31:
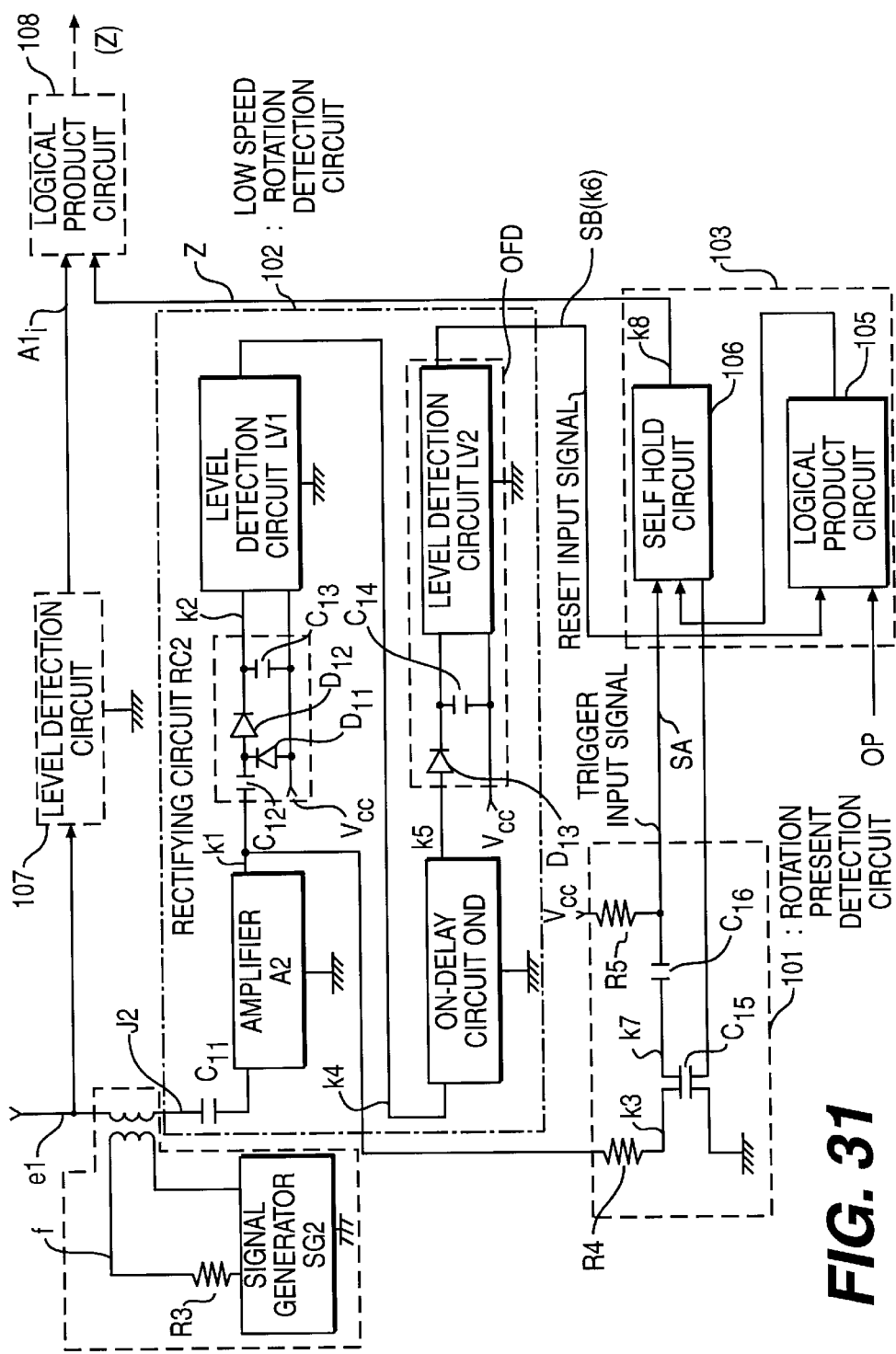

FOG. 10(A) is a circuit diagram of an embodiment of the present invention which uses a forced operation type electromagnetic relay for a relay RL2;

FIG. 10(B) is a circuit diagram of an embodiment of the present invention which uses a forced operation type electromagnetic relay for a relay RL1;

FIG. 10(C) is a circuit diagram of an embodiment of the present invention which uses a forced operation type electromagnetic relay for the relay RL1 and the relay RL2;

FIG. 10(D) is a circuit diagram of another embodiment which uses a forced operation type electromagnetic relay for the relay RL1 and the relay RL2;

FIG. 11 is an operation time chart for the circuit of FIG. 10(A);

FIG. 12 is a circuit diagram of the principal part of yet another embodiment of the present invention;

FIG. 13 is a circuit example of a poor contact point detection circuit applicable to the present invention;

FIG. 14(A) is a circuit condition diagram for the circuit of FIG. 13 when normal;

FIG. 14(B) is a diagram showing an example of a circuit connection condition for the circuit of FIG. 13 at the time of poor contact;

FIG. 15 is a circuit example of another embodiment of a poor contact point detection circuit;

FIG. 16(A) is a circuit condition diagram for the circuit of FIG. 15 when normal;

FIG. 16(B) is a diagram showing an example of a circuit connection condition for the circuit of FIG. 15 at the time of poor contact;

FIG. 17 is a circuit diagram of yet another embodiment of a poor contact point detection circuit;

FIG. 18(A) is a circuit condition diagram for the circuit of FIG. 17 when normal;

FIG. 18(B) is a diagram showing an example of a circuit connection condition for the circuit of FIG. 17 at the time of poor contact;

FIG. 19 is a circuit diagram of yet another embodiment of a poor contact point detection circuit;

FIG. 20(A) is a circuit condition diagram for the circuit of FIG. 19 when normal;

FIG. 20(B) is a diagram showing an example of a circuit connection condition for the circuit of FIG. 19 at the time of poor contact;

FIG. 21 is a circuit diagram of the principal part of yet another embodiment of the present invention;

FIG. 22 is a circuit diagram of the principal part of yet another embodiment of the present invention;

FIG. 23 is a circuit diagram of the principal part of yet another embodiment of the present invention;

FIG. 24 is a circuit configuration for the case where the embodiment of the present invention in FIG. 1 is applied to a change completion detection circuit;

FIG. 25 is a circuit configuration for the case where the embodiment of the present invention in FIG. 3 is applied to a change completion detection circuit;

FIG. 26 is a circuit configuration for the case where the embodiment of the present invention in FIG. 4 is applied to a change completion detection circuit;

FIG. 27 is a circuit configuration for the case where the embodiment of the present invention in FIG. 8 is applied to a change completion detection circuit;

FIG. 28 is another circuit configuration for the case where the embodiment of the present invention in FIG. 8 is applied to a change completion detection circuit;

FIG. 29 is yet another circuit configuration for the case where the embodiment of the present invention in FIG. 3 is applied to a change completion detection circuit;

FIG. 30 is a circuit configuration for the case where the embodiment of the present invention in FIG. 22 is applied to a change completion detection circuit; and FIG. 31 is an example of a basic circuit diagram of a change completion detection circuit.

DESCRIPTION OF THE PREFERRED EMBODIMENTS

Following is a description of embodiments of a motor stopped verification sensor according to the present invention, with reference to the drawings.

FIG. 1 is a circuit diagram showing a first embodiment of a motor stopped verification sensor according to the present invention.

In FIG. 1, a three phase AC motor 1 has three power supply lines u, v, w. These three supply lines u, v, w are connected to a motor power source 2 via mutually linked excitation contact points $r_{1a}$, $r_{1b}$, $r_{1c}$ of a relay RL1. The relay RL1 is excited when a voltage Vcc is supplied with the switching on of a motor operating switch SW.

A high frequency signal generator SG is connected to a primary winding Na of a first transformer $T_1$, for supplying thereto a high switching signal of a lower level (for example 5 KHz, 5 V) than the power source voltage (for example AC 200 V) of the motor power source 2. A secondary winding Nb of the first transformer $T_1$ has one end connected by a signal input line C to the power supply line w, and the other end connected between a first primary winding $N_1$ and a second primary winding $N_2$ of a second transformer $T_2$. The other end of the first primary winding $N_1$ of the second transformer $T_2$ is connected by a signal input line B to the power supply line u via a first resistor $R_1$ and a first capacitor $C_1$. The other end of the second primary winding $N_2$ of the second transformer $T_2$ is connected by a signal input line A to the power supply line v via a second resistor $R_2$ having a different resistance to that of the first resistor $R_1$, and a second capacitor $C_2$. Consequently, the three signal input lines A~C are connected such that a closed circuit is made up with the power supply line w as a common line, and the power supply lines u and v connected together in parallel.

A high frequency signal current from the high frequency signal generator SG is respectively supplied to the power supply lines u, v, with the power supply line w as a common line, and a signal corresponding to the difference in the values of the currents flowing via the power supply lines u and v to the signal input lines A and B, is output from a secondary winding $N_3$ of the second transformer $T_2$. Here the high frequency signal generator SG, the first and second transformers $T_1$, $T_2$, the first and second resistors $R_1$, $R_2$, the first and second capacitors $C_1$, $C_2$, and the three signal input lines A~C constitute a sensor section. Consequently, the output signal from the secondary winding $N_3$ of the second transformer $T_2$ becomes the output signal from the sensor section 3.

The first resistor $R_1$ and the first capacitor $C_1$, and the second resistor $R_2$ and the second capacitor $C_2$, constitute respective known snubber circuits. The first and second capacitors $C_1$, $C_2$ have the function of protecting the first and second transformers $T_1$, $T_2$ from the motor power source 2.

The output from the sensor section 3, that is, the output from the secondary winding $N_3$ of the second transformer $T_2$, is amplified by an amplifier 4. The amplified output from the amplifier 4 is full wave rectified by a rectifying circuit 5 and envelope detected. The envelope detection output from the rectifying circuit 5 is input to a window comparator 6 which has a predetermined upper limit threshold value $V_H$ and lower limit threshold value $V_L$ set for the input signal, and subjected to a threshold value operation. When the output level from the rectifying circuit 5, based on the output from the sensor section 3, is within the range of the upper limit threshold value $V_H$ and the lower limit threshold value $V_L$ of the window comparator 6, an output of logic value 1 is generated from the window comparator 6, while when the output level from the rectifying circuit 5, based on the output from the sensor section 3, is outside of the range of the upper limit threshold value $V_H$ and the lower limit threshold value $V_L$ of the window comparator 6, an output of logic value 0 is generated from the window comparator 6. Here the amplifier 4, the rectifying circuit 5, and the window comparator 6 constitute a signal processing circuit 7.

The output from the window comparator 6 of the signal processing circuit 7 is input to a first on-delay circuit 8, from which a judgment output $P_1$ indicating the presence of motor rotation (including rotation under inertia) is generated. More specifically, in the case where an output of logic value 1 from the window comparator 6 continues for a delay time τ of the on-delay circuit 8 or more, then after the elapse of the time τ, the judgment output $P_1$ from the on-delay circuit 8 becomes a logic value 1 indicating that motor rotation has stopped. Furthermore, immediately the output from the window comparator 6 becomes a logic value 0, then the judgment output $P_1$ from the on-delay circuit 8 becomes a logic value 0 indicating that the motor is rotating.

Here the window comparator 6 and the on-delay circuit 8 are conventional known devices disclosed for example in PCT Publication No. WO94/23303. The window comparator 6 comprises a plurality of transistors and resistors, with the construction being such that when an input signal within a predetermined threshold value range higher than the power source voltage Vcc is input to the input terminal, the circuit oscillates so that an AC output is produced. Furthermore, the construction is fail-safe in that at the time of a fault an output is not produced. The on-delay circuit 8 also is a conventional known device constructed using a PUT or the like, the construction being fail-safe in that at the time of a fault the delay time t does not shorten.

Next is a description of the operation of the circuit of the first embodiment.

When the motor operating switch SW is switched on, the relay RL1 is excited and the respective excitation contact points $r_{1a}$, $r_{1b}$, $r_{1c}$ come on, so that a motor drive current flows in the power supply lines u, v, w of the motor 1, and the motor 1 rotates. Moreover, the high frequency signal current from the high frequency signal generator SG also flows in the respective power supply lines u, v, w. At this time since the resistance values of the first resistor $R_1$ and the second resistor $R_2$ are different, then a difference occurs in the current flowing in the first primary winding $N_1$ and the second primary winding $N_2$ of the second transformer $T_2$, and this changes accompanying the rotation of the rotor of the motor 1. An output corresponding to this difference change is generated from the secondary winding $N_3$ as an output signal from the sensor section 3.

When the motor 1 rotates, the level of the motor drive current flowing to the motor 1 is higher than the signal level of the high frequency signal generator SG, and hence the amplitude of the envelope detection output from the rectifying circuit 5 is changed to exceed the upper limit threshold value $V_H$ and the lower limit threshold value $V_L$ of the window comparator 6. In this case, since the output from the rectifying circuit 5 horizontally cuts within the range of the upper limit threshold value $V_H$ and the lower limit threshold value $V_L$, an output of logic value 1 is intermittently generated from the window comparator 6 accompanying the changes in the output from the rectifying circuit 5. However, since the time for the output of logic value 1 is shorter than the delay time τ of the on-delay circuit 8, then the judgment output $P_1$ from the on-delay circuit 8 continues at a logic value 0 indicating that the motor is rotating.

When the motor operating switch SW is switched off, the relay RL1 becomes non excited and the excitation contact points $r_{1a}$, $r_{1b}$, $r_{1c}$ go off, so that the power supply to the motor 1 is interrupted. However the motor 1 does not stop immediately, continuing to rotate under inertia. At this time the high frequency current supplied from the high frequency signal generator SG flows in the first and second primary windings $N_1$, $N_2$ of the second transformer $T_2$ so that an output signal corresponding to the current difference is generated in the secondary winding $N_3$. With the high frequency current respectively flowing in the first and second primary windings $N_1$, $N_2$ of the second transformer $T_2$, since the impedance of the motor excitation winding changes with the rotation of the rotor of the motor 1, this high frequency current changes with the change in impedance. Consequently, when the rotor of the motor 1 rotates under inertia, the output signal from the secondary winding $N_3$, that is to say, the output signal from the sensor section 3 changes. This output signal from the sensor section 3 is input to the window comparator 6 via the amplifier 4 and the rectifying circuit 5.

Figure 2:
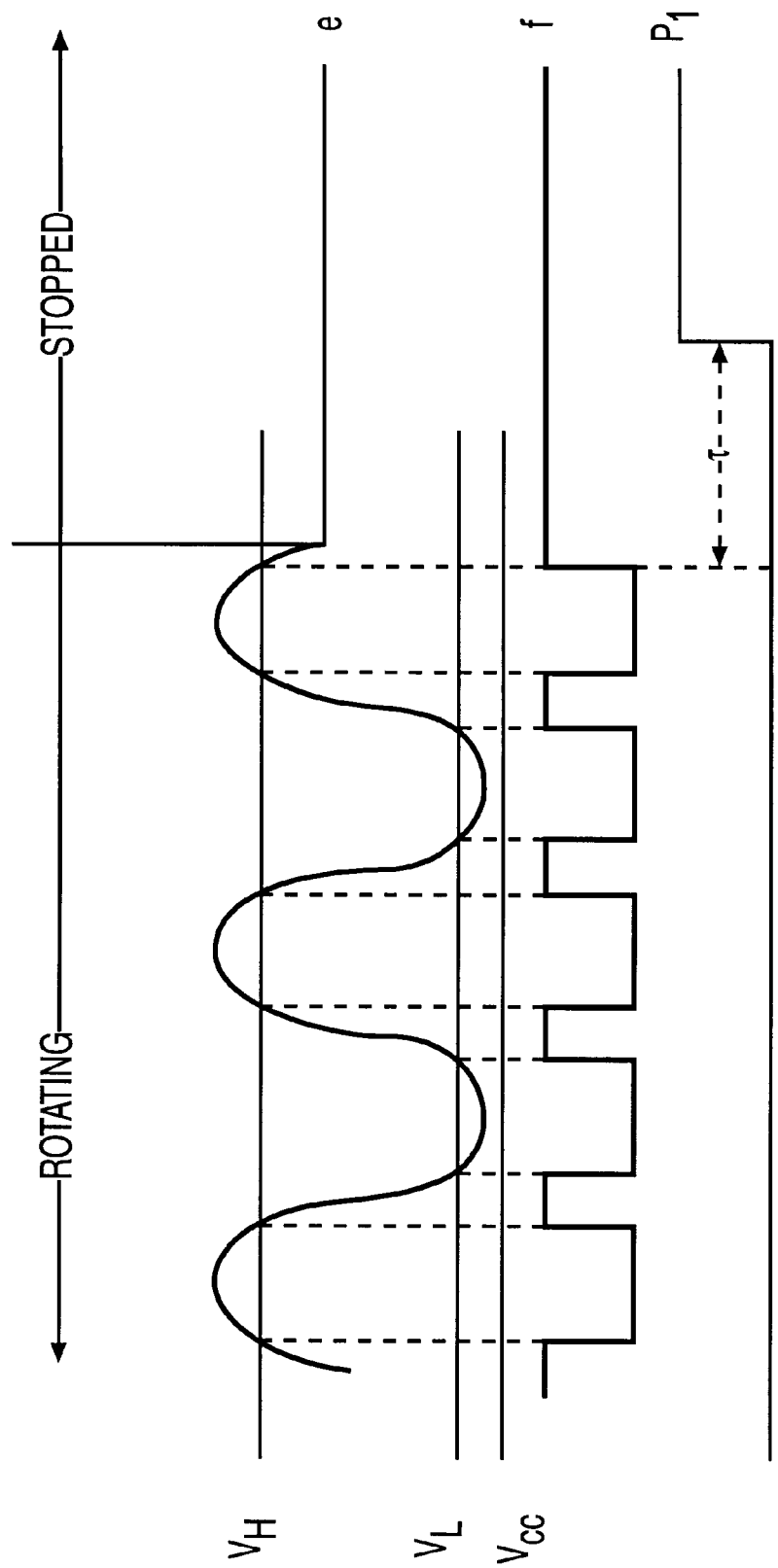
FIG. 2 is a time chart for the output from the principal circuit of FIG. 1.

While the rotational speed of the rotor is fast, then as shown in FIG. 2, the amplitude of an envelope detection output e from the rectifying circuit 5 exceeds the upper limit threshold value $V_H$ and the lower limit threshold value $V_L$ of the window comparator 6, and hence an output f from the window comparator 6 intermittently becomes a logic value 1. However, since the continuous time of the logic value 1 is shorter than the delay time t of the on-delay circuit 8, then the judgment output $P_1$ from the on-delay circuit 8 remains at the logic value 0 indicating that the motor is rotating. The amplitude of the output from the rectifying circuit 5 becomes smaller with the drop in rotational speed of the rotor of the motor 1, and once this ceases to exceed the upper limit threshold value $V_H$ and the lower limit threshold value $V_L$ of the window comparator 6, then an output of logic value 1 is continuously generated from the window comparator 6. In this case, at the point in time when the delay time τ of the on-delay circuit 8 has elapsed, the judgment output $P_1$ from the on-delay circuit 8 becomes a logic value 1, indicating that the motor rotation has stopped.

In the case of a fault in the sensor section 3 or the signal processing circuit 7, the judgment output from the on-delay circuit 8 becomes a logic value 0, being the same as the output condition indicating that the motor is rotating, and hence the construction is fail-safe.

With such a construction, it is also possible to detect rotation of the motor 1 due to inertia, with the judgment output $P_1$ of logic value 1 indicating that motor rotation has stopped, not being generated until the motor 1 has almost stopped rotating. Hence the safety of an operator in the vicinity of an operating machine being driven by the motor 1 can be improved. Moreover, compared to the conventional rotation stopped verification sensor of the electromagnetic pickup type, since there is no sensor head and hence no need for accurate control of the attachment position, then the sensor attachment operation can be made extremely simple. Moreover, costs for maintenance and inspection of the sensor can be reduced.

The impedance of the excitation windings of the motor 1 differ depending on the position where the rotor stops. The upper limit threshold value $V_H$ and the lower limit threshold value $V_L$ of the window comparator 6 are therefore set so that the envelope detection output level of the rectifying circuit 5 for when the impedance of the excitation windings is a maximum and a minimum is within the range of the upper limit threshold value $V_H$ and the lower limit threshold value $V_L$. In this way, irrespective of the position where the rotor stops, an output of logic value 1 can be generated from the window comparator 6 when the rotor is stopped.

Moreover, the arrangement is such that the output from the rectifying circuit 5 is superimposed on the power source voltage Vcc of the window comparator 6, and input to the window comparator 6, so that when normal, a signal of a higher level than the power source voltage Vcc is always input to the window comparator 6.

FIG. 3 shows a circuit diagram of a second embodiment of the invention. Components the same as for the first embodiment of FIG. 1 are indicated by the same symbols and description is omitted.

In FIG. 3, a motor operating switch SW' of the embodiment comprises a change-over switch which can selectively change between an operating ON contact point "a" for supplying a drive voltage Vcc to the motor 1, and an on-delay circuit ON contact point "b" for supplying power source voltage to the on-delay circuit 8. The operating ON contact point "a" is connected to the relay RL1 side, while the on-delay circuit ON contact point "b" is connected to the power supply terminal of the on-delay circuit 8.

With such a construction, if the motor operating switch SW' is connected to the operating ON contact point "a" side, then the motor 1 rotates as a result of excitation of the relay RL1. At this time, the on-delay circuit ON contact point "b" goes off so that power supply to the on-delay circuit 8 ceases. The operation of the on-delay circuit 8 is thus forcibly stopped so that the judgment output $P_1$ from the on-delay circuit 8 becomes a logic value 0, indicating that the motor is rotating. If the motor operating switch SW' is connected to the on-delay circuit ON contact point "b" side, then the power supply to the on-delay circuit 8 is started and simultaneously the power supply to the motor 1 is stopped. In this case, due to a similar operation to that described for the first embodiment of FIG. 1, when the rotation of the motor 1 due to inertia has practically stopped, an output of logic value 1 indicating that motor rotation has stopped is generated from the on-delay circuit 8. That is to say, the logical product output for the output signal from the window comparator 6 and the motor power source going OFF, becomes the output signal from the on-delay circuit 8. Here the change-over switch SW' corresponds to a first switching device.

With such a construction, then in addition to the effect of the first embodiment, the judgment output $P_1$ from the on-delay circuit 8 can be forcibly made a logic value 1 during operation of the motor 1, and hence safety can be further improved.

With the second embodiment, the construction uses a change-over switch SW' to forcibly interrupt the output from the on-delay circuit 8 during motor power supply, so that the output from the on-delay circuit 8 becomes a logic value 0. However, instead of the change-over switch SW', a current sensor may be used.

FIG. 4 shows a circuit configuration of a third embodiment of the present invention for the case where a current sensor is used. Components the same as in FIG. 1 are indicated by the same symbols and description is omitted.

In FIG. 4, with the third embodiment, two current sensors 20, 30 and an AND gate 40 serving as a first logical product operating device, are added to the circuit of FIG. 1.

That is to say, two of the three power supply lines u, v, w for the motor 1, for example power supply lines u and w, are provided with current sensors 20, 30. The current sensors 20, 30 are of the same construction.

More specifically, the construction incorporates: saturable magnetic cores 21, 31 through which the respective power supply lines u, w pass, primary windings $N_{21}$, $N_{31}$ and secondary windings $N_{22}$, $N_{32}$ wound on the saturable magnetic cores 21, 31, high frequency signal generators 22, 32 for supplying high frequency signals to the primary windings $N_{21}$, $N_{31}$, and signal processing circuits 23, 33 for processing outputs from the secondary windings $N_{22}$, $N_{32}$.

With the respective current sensors 20, 30, when a current flows in the power supply lines u, w, the saturable magnetic cores 21, 31 become saturated. Therefore the high frequency signals supplied to the primary windings $N_{21}$, $N_{31}$ are not transmitted to the secondary windings $N_{22}$, $N_{32}$ side, so that the outputs from the signal processing circuits 23, 33 become logic values 0. When a current does not flow in the power supply lines u, w, then the saturable magnetic cores 21, 31 are not saturated, and hence the high frequency signals supplied to the primary windings $N_{21}$, $N_{31}$ are transmitted to the secondary windings $N_{22}$, $N_{32}$ side so that the outputs from the signal processing circuits 23, 33 become logic values 1.

With the AND gate 40, the outputs from the current sensors 20, 30, and the output $P_1$ from the on-delay circuit 8 are input as input signals, and the result of a logical product operation on these signals is output as a judgment output $P_1'$ for indicating the presence of motor rotation.

With such a construction, when the motor 1 is operating, since a current flows in one or both of the power supply lines u, w, then the output from one or both of the current sensors 20, 30 becomes a logic value 0. Consequently, the judgment output $P_1'$ from the AND gate 40 becomes a logic value 0 indicating that the motor 1 is rotating. On the other hand, when the drive voltage supply to the motor 1 is interrupted, then a motor drive current does not flow in the power supply lines u, w, and hence the outputs from the current sensors 20, 30 both become a logic value 1. Consequently, when the output $P_1$ of logic value 1 indicating that motor rotation has stopped is generated from the on-delay circuit 8, the judgment output $P_1'$ from the AND gate 40 becomes a logic value 1 indicating that motor rotation has stopped.

With the construction of the third embodiment also, as with the second embodiment, the judgment output $P_1'$ from the AND gate 40 during operation of the motor 1 can be forcibly made a logic value 0, and hence operator safety can be improved.

Here the AND gate 40 is a fail safe AND gate with the same circuit configuration as the beforementioned fail-safe window comparator, and with the upper limit threshold value set sufficiently high, the arrangement being such that at the time of a fault the output becomes a logic value 0. Such a fail-safe AND gate is known for example from U.S. Pat. No. 4,661,880, and PCT Publication Nos. WO94/23303, and WO94/23496.

With the abovementioned third embodiment, the construction is such that the AND gate 40 is located after the on-delay circuit 8. However a construction is also possible where this is located before the on-delay circuit 8. That is to say, instead of having the judgment output $P_1$ from the on-delay circuit 8 input to the AND gate 40, the output from the window comparator 6 may be input, and the output from the AND gate 40 then input to the on-delay circuit 8.

Next is a description of an embodiment of a motor stopped verification sensor which is suited to the case where a load is driven by a motor 1 via a pulley belt.

Figure 5:
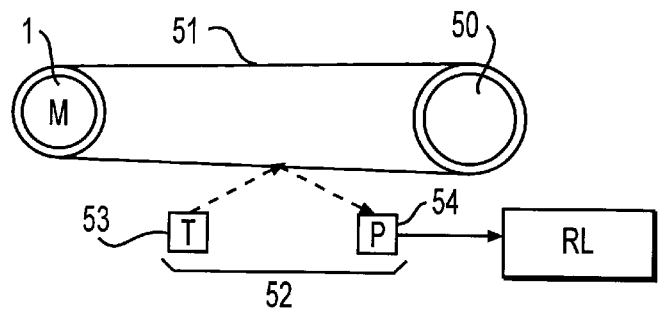
FIG. 5 is a structural diagram of an optical sensor for detecting the presence of a pulley belt.

In FIG. 5, a reflecting type optical sensor 52 is provided as a pulley belt presence detection sensor for detecting breakage of a pulley belt 51 which connects a motor 1 and a load 50.

The reflecting type optical sensor 52 comprises a projector 53 which projects a light beam onto the pulley belt 51, and a light receiver 54 which receives the reflected light of the light beam projected from the projector 53 and reflected by the pulley belt 51. With the optical sensor 52, when the pulley belt 51 is normally present so that the light beam from the projector 53 is reflected by the pulley belt 51 and received by the light receiver 54, an output of logic value 1 indicating the presence of the pulley belt 51 is generated. When the pulley belt 51 is broken so that there is no reflected light related to the light beam from the projector 53, and hence reflected light is not received by the light receiver 54, an output of logic value 0 indicating that the pulley belt 51 is broken is generated.

In the case of the circuit configuration of FIG. 3, a relay RL is excited by the output from the optical sensor 52, and, as shown by the dotted line in FIG. 3, excitation contact points r of the relay RL are disposed in series in the power supply line of the on-delay circuit 8.

With such a construction, then in the case where the pulley belt 51 is present and not broken, the excitation contact points r are ON, and hence power supply to the on-delay circuit 8 is possible. Therefore when the motor 1 is stopped, a judgment output of logic value 1 indicating that the motor rotation is stopped is generated from the on-delay circuit 8. On the other hand, in the case where the pulley belt 51 is broken and thus not present, the excitation contact points r go OFF, and hence power is not supplied to the on-delay circuit 8, and the judgment output $P_1$ from the on-delay circuit 8 becomes a logic value 0 even if the motor 1 is stopped, thus giving output conditions the same as for when the motor is rotating. Here the excitation contact points r of the relay RL correspond to a second switching device.

In the case where the load 50 is driven via the pulley belt 51, then if the pulley belt 51 breaks before the motor 1 stops, the load 50 may still be moving even though the motor 1 has stopped. If at this time, an output of logic value 1 is generated from the on-delay circuit 8 by detecting only the stopping of the motor 1, then there will be danger. By using the optical sensor 52 in the above manner to detect the presence of breakage of the pulley belt 51, and controlling the power supply to the on-delay circuit 8 based on this detection signal, then in the case where the pulley belt 51 is broken, the judgment output $P_1$ from the on-delay circuit 8 can be made a logic value 0, so that operator safety can be ensured.

Since a reflecting type optical sensor 52 is used for the pulley belt presence detection sensor, then if the optical sensor 52 malfunctions with for example the optical beam ceasing to be projected from the projector 53, then the output from the light receiver 54 becomes a logic value 0, being the same output condition as for when the pulley belt is broken. Therefore, the judgment output $P_1$ from the on-delay circuit 8 becomes a logic value 0 indicating danger, and hence safety at the time of a malfunction in the optical sensor 52 can be ensured.

Moreover, in the case where the AND gate 40 is used as with the circuit configuration of FIG. 4, then as shown by the dotted line in FIG. 4, the output from the optical sensor 52 can be one of the inputs to the AND gate 40. In this case, when the pulley belt 51 breaks, the judgment output $P_1'$ from the AND gate 40 becomes a logic value 0, being the same output condition as for when the motor is rotating, and hence safety of the operator can be ensured.

Figure 6:
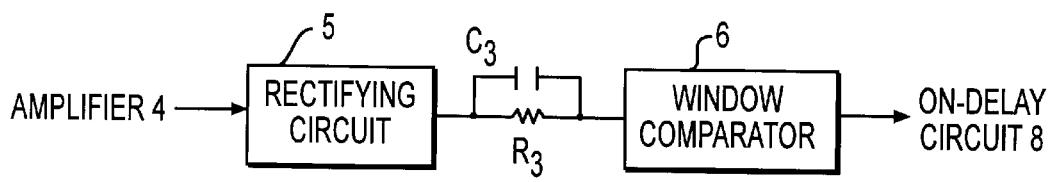
FIG. 6 is an example of a circuit for adjusting the input level of a window comparator.

With the circuits of the respective embodiments shown in FIG. 1, FIG. 3 and FIG. 4, a parallel circuit of a resistor R3 and a capacitor C3 as shown in FIG. 6, may be inserted between the rectifying circuit 5 and the window comparator 6.

In this case, if the input level to the window comparator 6 when rotation of the motor 1 has stopped is $V_A$, then if the input resistance for the window comparator 6 is Ri and the output voltage from the rectifying circuit 5 is e, the input level $V_A$ becomes:

$$V_A = [Ri/(Ri+R3)] \cdot e$$

In this way, the DC input level to the window comparator 6 can be reliably made to fit within the range of the upper limit threshold value $V_H$ and the lower limit threshold value $V_L$ of the window comparator 6, and the output from the window comparator 6 when the motor 1 is stopped can be reliably made a logic value 1. Of the output signals from the rectifying circuit 5 for when the motor is rotating, the signal change accompanying rotor rotation is input directly to the window comparator 6 via the capacitor $C_3$.

Figure 7:
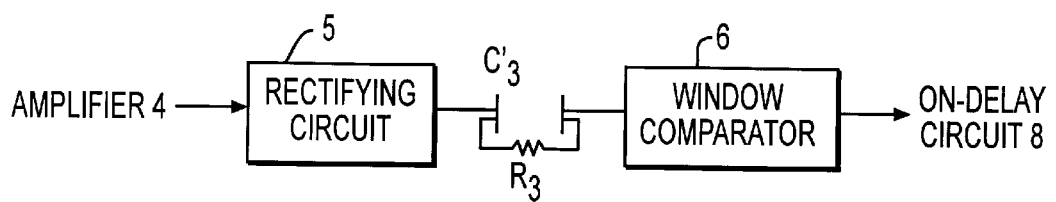
FIG. 7 is a circuit diagram showing an example of a variant of the circuit of FIG. 6.

With the construction of FIG. 6, if a disconnection fault occurs in the capacitor $C_3$, then the signal accompanying rotation of the motor 1 will not be transmitted to the window comparator 6, and hence an erroneous judgment signal may be generated. In consideration of a disconnection fault of the capacitor $C_3$, preferably the capacitor $C_3$ of FIG. 6 is made a four terminal capacitor $C_3'$ as shown in FIG. 7. In the case where a disconnection fault occurs in the four terminal capacitor $C_3'$, the input signal to the window comparator 6 ceases. The output from the motor stopped verification sensor thus becomes a logic value 0 so that the fact that a fault may have occurred in the verification sensor can be known.

Incidentally, the motor stopped verification sensor of the present invention is one which detects that rotation of the motor has stopped, by using the signal change after shutting off motor power, that is, in the period where power is not being supplied to the motor. It is therefore sufficient that, once the motor power source has been shut off, the sensor is connected to the motor power source system. Hence it is thus desirable during motor power supply, for the sensor side to be insulated from the motor power source system.

In the case of the above respective embodiments, insulation is achieved by using the capacitors $C_1$, $C_2$. However, in the case where the motor power source is, for example, a high frequency power source such as with an inverter power source, then the power source voltage is switched at a frequency of several KHz or more. If sufficient insulation against this power source cannot be achieved with a capacitor and transformer, then the voltage from the motor power source system may be transmitted to the sensor side. In this case, the sensor side elements (resistors and the like) which carry this voltage must have a voltage capacity which can withstand this voltage, thus leading to an increase in size and cost of the sensor elements.

As follows is an illustration of an embodiment suited to the case where a high frequency power source such as an inverter power source is used for the motor power source. Components the same as for the beforementioned embodiments are indicated by the same symbols and description is omitted.

In FIG. 8, the connection of the three power supply lines u, v, w for the three phase AC motor 1 to the motor power source 2 via the three excitation contact points $r_{1a}, r_{1b}, r_{1c}$ of the relay RL1 is the same as for the beforementioned embodiments. With the motor power source 2, instead of a commercial AC power source, this may be a high frequency power source such as in inverter power source. Three excitation contact points $r_{2a}, r_{2b}, r_{2c}$ of a relay RL2 are inserted in series in the signal input lines A, B, C connected to the power supply lines u, v, w of the motor 1. The relay RL1 is excited with the supply of a voltage Va via a first switch SW1 which is switched on by a motor operation command signal, while the relay RL2 is excited by the supply of a voltage Vb via a second switch SW2 which is linked with the first switch SW1 so as to have a mutually complementary relationship such that when the first switch SW1 is on, the second switch SW2 is off.

With the present embodiment, the relay RL1 corresponds to a first electromagnetic relay, while the relay RL2 corresponds to a second electromagnetic relay. Moreover, the respective excitation contact points $r_{1a}, r_{1b}, r_{1c}$ correspond to first switching elements, while the respective excitation contact points $r_{2a}, r_{2b}, r_{2c}$ correspond to second switching elements. Furthermore, the mutually linked first switch SW1 and second switch SW2 correspond to the switching element control device.

With a sensor section 3', the circuit construction is the same as that of the sensor section 3 shown in FIG. 1, except that a resistor $r_s$ is inserted between the high frequency signal generator SG and the primary winding Na of the first transformer $T_1$, the signal input line A is connected to the power supply line u, the signal input line B is connected to the power supply line v, and the capacitors $C_1$, $C_2$ are left out. The signal input lines A, B can however be connected in the same manner as for the sensor section 3 of FIG. 1 without any problem. Symbols $X_1$, $X_2$ indicate resistors the same as the resistors $R_1$, $R_2$.

Consequently, with the sensor section 3' of the present embodiment also, as with the sensor section 3 of FIG. 1, a closed circuit is made up with the power supply line w as a common line, and the power supply lines u and v connected together in parallel. A high frequency signal current from the high frequency signal generator SG is respectively supplied to the power supply lines u, v, with the power supply line w as a common line. A signal corresponding to the difference in the values of the currents flowing in the power supply lines u, v is then output from the secondary winding $N_3$ of the second transformer $T_2$, and the output signal from the secondary winding $N_3$ of the second transformer $T_2$ becomes the output signal from the sensor section 3'.

The output signal from the sensor section 3' is input to a signal processing circuit 7 of the same construction as for the first embodiment of FIG. 1, and depending on the logic value of an output signal from the signal processing circuit 7 which is based on processing operations the same as those mentioned before, a judgment output $P_1$ is generated from the on-delay circuit 8, indicating the presence or absence of rotation of the motor (including rotation under inertia).

Next is a description of the operation of the circuit shown in FIG. 8.

When the first switch SW1 is switched on by a motor operation command, the relay RL1 is excited and the respective excitation contact points $r_{1a}$~$r_{1c}$ come on, so that a motor drive current flows in the power supply lines u, v, w of the motor 1, and the motor 1 rotates. At this time, since the second switch SW2 goes off, then the relay RL2 becomes non excited so that the excitation contact points $r_{2a}$~$r_{2c}$ go off. Consequently, at the time of power supply to the motor 1, the respective signal input lines A~C of the sensor section 3' can be cut off from the power source system of the motor 1 and thus reliably insulated. Hence transmission of voltage from the motor power source system to the sensor section 3' side can be prevented.

On the other hand, in the case where the first switch SW1 goes off so that the relay RL1 becomes non excited and power supply to the motor 1 is stopped, then the second switch SW2 comes on so that the excitation contact points $r_{2a}$~$r_{2c}$ come on and the sensor section 3' is connected to the power supply lines u~w of the motor 1 via the signal input lines A~C. Then, while rotor speed is fast during inertial rotation of the motor 1, an intermittent output of logic value 1 is generated from the window comparator 6 over a shorter period than the delay period of the on-delay circuit 8. The judgment output $P_1$ from the on-delay circuit 8 thus remains at logic value 0 indicating that the motor is rotating. When the rotational speed of the rotor of the motor 1 decreases to a certain extent so that the amplitude of the change in the output from the rectifying circuit 5 comes within the threshold value range of the window comparator 6, then an output of logic value 1 is continuously generated from the window comparator 6. Then, at the point in time when the delay time of the on-delay circuit 8 has elapsed, the judgment output $P_1$ from the on-delay circuit 8 becomes a logic value 1, indicating that motor rotation has stopped.

With such a construction, the sensor section 3' can be reliably insulated from the motor power source system by the switching off of the excitation contact points $r_{2a}$~$r_{2c}$ during motor operation. Therefore transmission of a voltage from the motor power source system to the sensor section 3' side can be prevented. Consequently, even when a high frequency power source such as in inverter power source is used for the motor power source 2, there will be no influence on the power transmission elements on the sensor section 3' side, even if there power capacity is small. Therefore miniaturization and reduced cost for the elements of the sensor section 3' can be realized.

With the embodiment of FIG. 8, mechanical type relay contact points are used for the first and second switching elements. However semiconductor relays (contactless relays) may also be used. Moreover, in the case where an inverter power source is used for the motor power source 2, the first switching elements may include the contactless switch already installed in the inverter power source. With the second switching elements, one of the three can be always on. This is because power will not be transmitted to the sensor section 3' side provided that at least two of the three motor power supply lines u~w of the motor 1 are not connected to the sensor section 3'. However in order to ensure insulation, then preferably at the time of motor power supply, all three signal lines are cut off.

The case can arise where, immediately after interrupting power supply to the motor 1, power (energy) is stored in the motor (for example with back electromotive force of the motor). Consequently, if the excitation contact points $r_{2a}$~$r_{2c}$ come on immediately after the excitation contact points $r_{1a}$~$r_{1c}$ go off, then the power stored in the motor 1 can be transmitted to the sensor section 3' side.

Figure 9:
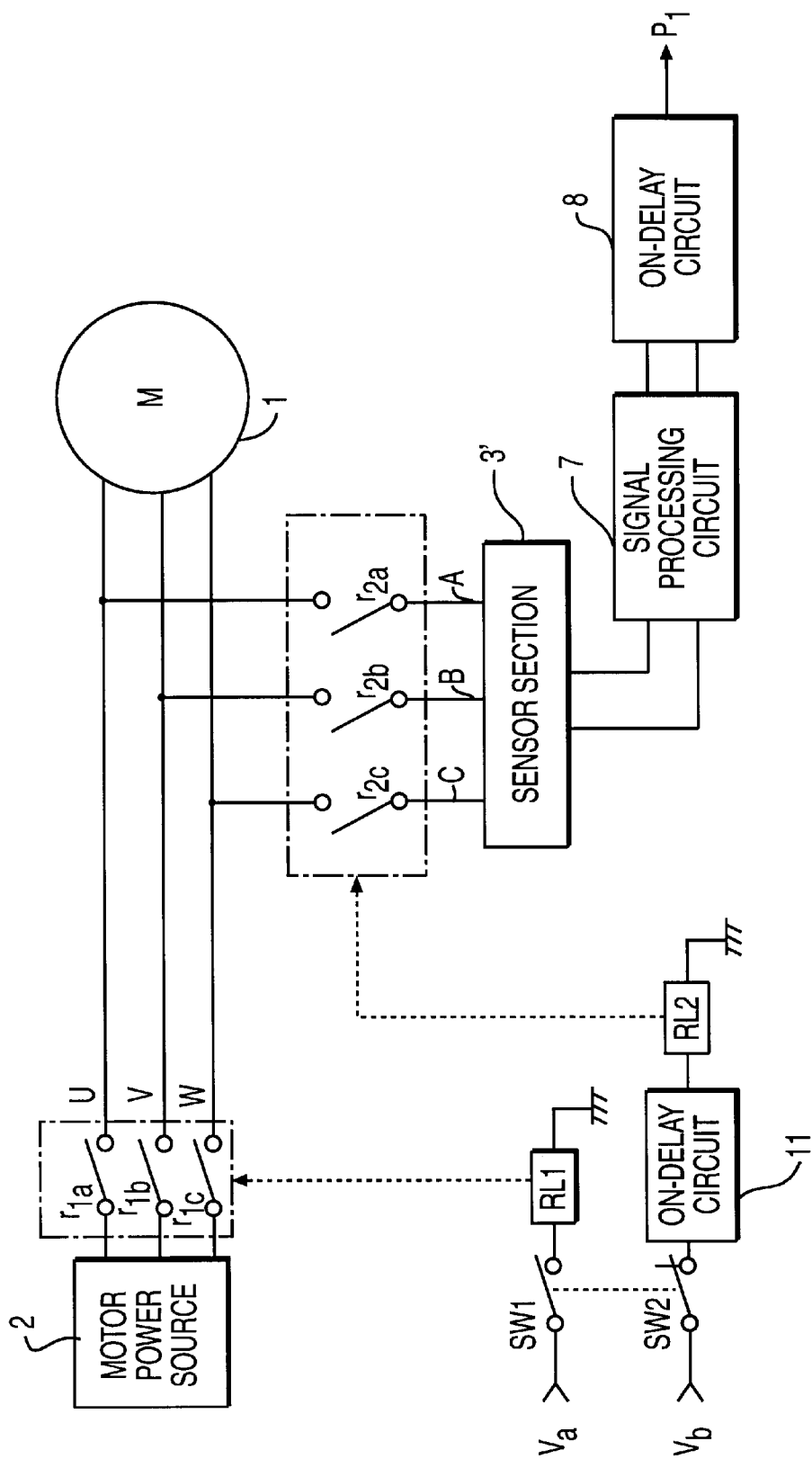
FIG. 9 is a circuit diagram of another embodiment of the present invention.

FIG. 9 shows a circuit configuration of an embodiment to solve this problem. Components the same as for the embodiment of FIG. 8 are indicated by the same symbols and description is omitted.

In FIG. 9, with the circuit of this embodiment, a second on-delay circuit 11 having a predetermined delay time (a sufficient time for the residual power of the motor 1 to drop to a value where it has no influence on the sensor section 3') is disposed between the second switch SW2 and the relay RL2. Here with the circuit of this embodiment, the switching element control device comprises the first and second switches SW1, SW2 and the on-delay circuit 11.

With such a construction, when the first switch SW1 is switched off so that power supply to the motor 1 is stopped, the second switch SW2 comes on. However due to the operation of the on-delay circuit 11, the relay RL2 is not excited until the lapse of a predetermined delay time. Consequently, the sensor section 3' can be connected to the motor power source system once the residual power of the motor 1 has dropped sufficiently with the lapse of the delay time from after stopping the motor power supply. Therefore transmission of the residual power of the motor 1 to the sensor section 3' side can be prevented.

At the start of power supply to the motor 1, the relay RL2 becomes non excited simultaneously with the switching off of the second switch SW2. Therefore there is no transmission of power from the motor power source system to the sensor section 3' side.

FIG. 10 shows a circuit configuration of embodiments which use a forced operation type electromagnetic relay as the switching elements. Components the same as in FIG. 8 are indicated by the same symbols and description is omitted.

FIG. 10(A) shows an embodiment for where a forced operation type electromagnetic relay is used for the relay RL2.

In FIG. 10(A), a self hold circuit 12 is provided between a second switch SW2 and a relay RL2 which uses a forced operation type electromagnetic relay. The trigger terminal of the self hold circuit 12 is connected to the second switch SW2 via first non excitation contact points $r_{2d}$ of the relay RL2, while the reset terminal is connected directly to the second switch SW2. Moreover, second non excitation contact points $r_{2e}$ of the relay RL2 are connected in series between a relay RL1 and earth. The first and second non excitation contact points $r_{2d}$, $r_{2e}$ are linked with the excitation contact points $r_{2a} \sim r_{2c}$ connected in series to the signal input lines A~C, so as to have a mutually complementary relationship such that when the excitation contact points $r_{2a} \sim r_{2c}$ are on, they go off. With the present embodiment, the switching element control device comprises the first and second switches SW1, SW2, and the self hold circuit 12.

The forced operation type electromagnetic relay is one having excitation contact points which come on when excited (normally open contact points), and non excitation contact points which come on when not excited (normally closed contact points), the mutual contact points being linked so as to have a complementary relationship such that when the excitation contact points come on, the non excitation contact points go off. Moreover the non excitation contact points do not come on if the excitation contact points are fused, and the excitation contact points to not come on if the non excitation contact points are fused.

The self hold circuit 12 uses a fail-safe AND gate comprising a plurality of resistors and transistors, arranged such that when the trigger input signal and the reset input signal are both at a higher level than the power source voltage, an output is generated and the input signal to the trigger terminal is self held, the construction being fail safe in that at the time of a fault, an output is not produced. Such a fail safe self hold circuit is known for example from U.S. Pat. Nos. 4,757,417, and 5,027,114, and PCT Publication Nos. WO94/23303, and WO94/23496.

Next is a description of the operation, with reference to the time chart of FIG. 11.

Under conditions with power being supplied to the motor 1, the second switch SW2 is in the off condition, and hence the input signal to the reset terminal of the self hold circuit 12 is a low level (logic value 0). Consequently, the relay RL2 is non excited, the excitation contact points $r_{2a} \sim r_{2c}$ are off, and the first non excitation contact points $r_{2d}$ are on.

Then, when the first switch SW1 is switched off and power supply to the motor 1 thus interrupted, the second switch SW2 is switched on so that a voltage Vb is applied to the reset terminal of the self hold circuit 12, giving a high level (logic value 1). At this time, since the first non excitation contact points $r_{2d}$ are on, then the voltage Vb is also applied to the trigger terminal, thus giving a high level (logic value 1), so that an output $P_2$ from the self hold circuit 12 becomes a logic value 1 and the relay RL2 is excited. As a result, the excitation contact points $r_{2a} \sim r_{2c}$ come on after an operational delay time t, and the first non excitation contact points $r_{2d}$ go off, so that the trigger input becomes a low level as indicated by the full line in FIG. 11. However, since the input signal to the trigger terminal is self held, as shown by the broken chain line in FIG. 11, by the output $P_2$ from self hold circuit 12, and hence kept at a high level, then the output $P_2$ from self hold circuit 12 is maintained at logic value 1, and the relay RL2 is thus kept in the excited condition.

Incidentally, in the case where the excitation contact points $r_{2a} \sim r_{2c}$ of the relay RL2 have a fusion fault and thus do not go off, then the second non excitation contact points $r_{2e}$ do not come on. Consequently, even if an operation command for motor drive is produced so that the first switch SW1 comes on, the relay RL1 is not excited. Therefore, the excitation contact points $r_{1a} \sim r_{1c}$ remain off and the motor power source 2 is thus not connected to the motor 1 so that the motor 1 is not driven. Furthermore, even if after a fusion fault of the excitation contact points $r_{2a} \sim r_{2c}$, the second switch SW2 comes on, since the first non excitation contact points $r_{2d}$ remains in the off condition, then the output $P_2$ from the self hold circuit 12 does not become a logic value 1.

With a relay of mechanical construction type such as the forced operation type relay, a delay of the order of several tens of milliseconds occurs in the operation of the contact points. In FIG. 11, t indicates this delay time. After the delay time t from when the excitation contact points $r_{1a} \sim r_{1c}$ go off and the power supply to the motor 1 stops, the excitation contact points $r_{2a} \sim r_{2c}$ come on, and hence the influence from the beforementioned back electromotive force of the motor can be alleviated to some degree.

In order to reliably remove the influence from the back electromotive force of the motor, the construction may involve applying an input signal to the reset terminal of the self hold circuit 12 via the on-delay circuit 11 shown in FIG. 9 and illustrated by the broken line in FIG. 10(A).

In this case, as shown by the two dot chain line in FIG. 11, the reset input signal becomes a logic value 1 after a delay time td of the on-delay circuit 11, so that the excitation contact points $r_{2a}-r_{2c}$ come on. The on-delay circuit 11 may be located between the self hold circuit 12 and the relay RL2.

FIG. 10(B) shows an embodiment for where a forced operation type electromagnetic relay is used for the relay RL1. Components the same as for the embodiment of FIG. 10(A) are indicated by the same symbols and description is omitted.

In FIG. 10(B), non excitation contact points $r_{1d}$ of the relay RL1 are provided between the trigger terminal of the self hold circuit 12 and the second switch SW2. The non excitation contact points $r_{1d}$ are contact points which only come on when the excitation contact points $r_{1a} \sim r_{1c}$ are all off.

With such a construction, only when the first switch SW1 is switched off so that the excitation contact points $r_{1a} \sim r_{1c}$ are all off, that is to say only when the motor power source 2 is cut off, is the relay RL2 excited. If at least one of the excitation contact points $r_{1a} \sim r_{1c}$ becomes fused, then the non excitation contact points $r_{1d}$ will not come on, and even if the second switch SW2 is switched on, the relay RL2 will not be excited, and hence application of the voltage from the motor power source 2 to the sensor section 3' can be prevented. Now the non excitation contact points $r_{1d}$ may be provided on the power supply line of the relay RL2, or on the power supply line for the on-delay circuit 11. Needless to say, the on-delay circuit 11 and the self hold circuit 12 may be omitted.

FIG. 10(C) shows an embodiment for where a forced operation type electromagnetic relay is used for both relays RL1 and RL2. Components the same as for the embodiment of FIG. 10(A) are indicated by the same symbols and description is omitted.

In FIG. 10(C), the self hold circuit 12 and the non excitation contact points $r_{2d}$ are omitted from the construction of FIG. 10(A), the relay RL2 is connected in series to the second switch SW2, and the non excitation contact points $r_{1d}$ of the relay RL1 are provided between the relay RL2 and earth. Moreover, an on-delay circuit 11 as shown by the dotted line in the figure may be provided.

With such a construction, in the case where at least one of the excitation contact points $r_{1a} \sim r_{1c}$ has a fusion fault, then the non excitation contact points $r_{1d}$ will not come on so that the relay RL2 will not be excited. Consequently, the excitation contact points $r_{2a} \sim r_{2c}$ will not come on and hence application of the voltage from the motor power source 2 to the sensor section 3' can be prevented. Moreover, in the case where at least one of the excitation contact points $r_{2a} \sim r_{2c}$ has a fusion fault, the voltage from the motor power source 2 could be applied to the sensor section 3'. However since the non excitation contact points $r_{2e}$ will not come on, then the relay RL1 will not be excited and hence the motor power source 2 will not be connected to the power supply lines u~w, and the voltage from the motor power source 2 will therefore not be applied to the sensor section 3'.

The circuit construction of FIG. 10(C) verifies, when the motor operation starts, from the non excitation contact points $r_{2e}$, that the excitation contact points $r_{2a}$~$r_{2c}$ are all off (that is to say, verifies that the sensor section 3' is cut off from the power supply lines u~w). Moreover, when the sensor portion is connected, this verifies from the non excitation contact points $r_{1d}$, that the excitation contact points $r_{1a}$~$r_{1c}$ are all off (that is to say verifies that the motor power source 2 is cut off from the power supply lines u~w).

As shown in FIG. 10(D), the construction may be such that a self hold circuit 12 and non excitation contact points $r_{2d}$ are added to the circuit of FIG. 10(C). In this case, at the time of connection of the sensor section 3', then in addition to verifying from the non excitation contact points $r_{1d}$ as mentioned above, that the excitation contact points $r_{1a}$~$r_{1c}$ are off, it is verified that the excitation contact points $r_{2a}$~$r_{2c}$ have been off immediately before this.

FIG. 12 shows a circuit configuration of yet another embodiment of the present invention. Components the same as for the embodiment of FIG. 8 are indicated by the same symbols and description is omitted.

In FIG. 12 with the present embodiment, a switch SW2' serving as a third switching device, is connected in series to a supply line D for the drive power source voltage Vcc for the on-delay circuit 8. The switch SW2', as with the second switch SW2, is linked with the first switch SW1 so as to have a mutual complementary relationship such that when the first switch SW1 is on the switch SW2' is off.

With this construction, in the case where the first switch SW1 is switched on so that power is supplied to the motor 1, the second switch SW2' is off and hence the drive power source voltage Vcc is not supplied to the on-delay circuit 8. When the first switch SW1 is switched off so that power supply to the motor 1 is interrupted, the second switch SW2' comes on so that the drive power source voltage Vcc is supplied to the on-delay circuit 8.

With such a construction, then with the circuits of the present embodiment shown in FIG. 8 through FIG. 10, during drive of the motor 1 there is no generation of an output of logic value 1 from the on-delay circuit 8 indicating that motor 1 rotation has stopped, and hence reliability of the sensor can be improved.

Next is a description of an embodiment provided with an OFF fault detection circuit for detecting an OFF fault when the second switching elements have an OFF fault (corresponding for example to a poor connection at the excitation contact points of the electromagnetic relay).

In the following embodiment, the OFF fault detection circuit is described as a circuit for detecting poor contact of the excitation contact points $r_{2a}$~$r_{2c}$.

FIG. 13 shows the configuration of the poor contact detection circuit. Components the same as in the beforementioned embodiments are indicated by the same symbols and description is omitted.

In FIG. 13, an input signal from a primary winding Na of a first transformer $T_1$ is input to a voltage doubler rectifying circuit 13 comprising two capacitors $C_A$, $C_B$ and two diodes $D_A$, $D_B$. The rectified output is then input to a window comparator 14 in which a predetermined threshold value range has been set, and an output $P_3$ from the window comparator 14 is made the poor contact detection output.

Next is a description of the poor contact detection theory.

An amplitude voltage Sw of the input signal to the winding Na is approximately equal to a value for where an amplitude voltage Vin of the high frequency signal generator SG has been divided up by a resistance $r_s$ and a load Z for when a load on the winding Nb side is converted to a load on the winding Na side. That is to say:

$$Sw \approx (|Z|/|r_s+Z|) \times Vin \qquad (1)$$

Here the load of the voltage doubler rectifying circuit 13 is sufficiently large so that it has practically no influence on the divided voltage.

The amplitude voltage Sw is larger at the time of poor contact than when the excitation contact points $r_{2a}$~$r_{2c}$ are normal. This will be described below with reference to FIG. 14(A) and FIG. 14(B).

FIG. 14(A) shows the circuit contact condition for when the excitation contact points $r_{2a}$~$r_{2c}$ are normal.

Inductances L1~L3 represent the respective windings of the motor 1. The inductance when seen from the winding Na of the first transformer $T_1$ is made Zn1.

Normally L1≈L2≈L3=L. FIG. 14(A) is a bridge circuit, and here for simplicity, $X_1 \approx X_2 = X$, and $N_1 \approx N_2 = N$ (number of windings) (with a bridge circuit these conditions are normally realized). Furthermore, the transformer self impedance is made large enough to be ignored.

At this time, Zn1 becomes as follows:

$$Zn1 \approx [(3jwL/2)+(X/2)] \times (Na/Nb)^2 \qquad (2)$$

Here w is the signal frequency of the high frequency signal generator SG, while Na, Nb are the number of windings.

FIG. 14(B) shows the circuit conditions for when poor contact occurs at the excitation contact points $r_{2a}$. At this time the impedance Zf1 as seen from the winding Na becomes as follows:

$$Zf1 \approx [(2jwL+X+ZA \times (N/N_3)^2] \times (Na/Nb)^2 \qquad (3)$$

where ZA is the impedance for connection to the winding $N_3$.

As is clear from equations (2) an (3) |Zn1|<|Zf1|. Consequently if the value for when the amplitude voltage Sw is normal is Swn, and the value at the time of poor contact is Swf, then Swn<Swf. If the upper limit threshold value for the window comparator 14 is set between the rectified voltage of Swn and the rectified voltage of Swf, then at the time of poor contact, the input signal level to the window comparator 14 will exceed the upper limit threshold value. Therefore the output $P_3$ from the window comparator 14 will not become a high level (logic value 1), but becomes a low level logic value 0 indicating poor contact.

The same applies for when poor contact occurs at the excitation contact points $r_{2b}$. Moreover, in the case where poor contact occurs at the excitation contact points $r_{2c}$, or the excitation contact points $r_{2a}$, $r_{2b}$ both have a poor contact, then |Zf1| becomes a maximum, and hence in the same way, the output $P_3$ from the window comparator 14 becomes a logic value 0.

Furthermore, in the case where a fault occurs in the voltage doubler rectifying circuit 13, the resultant rectified voltage becomes less than the lower limit threshold value of the window comparator 14 (a value higher than Vcc), and hence the output $P_3$ from the window comparator 14 becomes a logic value 0. Also in the case where the window comparator 14 is faulty, an output of logic value 0 results, and hence the poor contact can be detected with a fail-safe construction. Now, also with a construction wherein a separate third winding is provided for the first transformer $T_1$, and both terminal voltages therefrom are input to the voltage doubler rectifying circuit 13, poor contact detection is possible in the same way.

FIG. 15 shows another circuit examples of a poor contact detection circuit.

The circuit of FIG. 15 is one where poor contact is detected from a second transformer $T_2$ side.

In FIG. 15, a signal generator sg which generates a signal of frequency $\rho$ is connected to a winding $N_3$ of the second transformer $T_2$ via a resistor rg. A band pass filter 15 which passes signals of frequency w from the high frequency signal generator sg and stops signals of frequency $\rho$, is connected to the winding $N_3$. An output from the band pass filter 15 is input to a signal processing circuit 7.

At this time, a signal voltage amplitude $S\rho$ input to the winding $N_3$ becomes as follows:

$$S\rho \approx (|Z|/|rg+Z|) \times Vch \qquad (4)$$

Where Z is the impedance as seen from the winding $N_3$, and Vch is the amplitude voltage of the high frequency signal generator sg.

In the same way as before, when $L1 \approx L2 \approx L3 = L$, $X_1 \approx X_2 = X$, and $N_1 \approx N_2 = N$, then with the circuit contact condition of FIG. 16(A) when the excitation contact points $r_{2a} \sim r_{2c}$ are normal, the impedance Zn2 for when normal as seen from the winding $N_3$ becomes as follows:

$$Zn2 \approx (2j\rho L + 2X) \times (N_3/2N)^2 \qquad (5)$$

Furthermore, as with FIG. 16(B) for the case where the excitation contact points $r_{2a}$ have poor contact, the impedance Zf2 as seen from the winding $N_3$ becomes approximately as follows:

$$Zf2 \approx [(2j\rho L + X + rs' \times (Nb/Na)^2] \times (N_3/N)^2 \qquad (6)$$

In this case also, it is clear that $|Zn2| < |Zf2|$. Consequently if the value for when the amplitude voltage $S\rho$ is normal is $S\rho n$, and the value at the time of poor contact is $S\rho f$, then $S\rho n < S\rho f$. By setting the upper limit threshold value of the window comparator 14 between the rectified voltage for $S\rho n$ and the rectified voltage for $S\rho f$, then the poor contact can be detected. Also in the case where poor contact occurs at the excitation contact points $r_{2b}$, this can be similarly detected.

With the circuit configuration of FIG. 15, detection of poor contact of the excitation point contact points $r_{2c}$ is difficult. However, since at the time of poor contact of the excitation contact points $r_{2c}$, the signal of frequency w from the high frequency signal generator SG is no longer received, then the input signal level to the signal processing circuit 7 drops, becoming lower than the lower limit threshold value of the window comparator 6. As a result, the output $P_1$ from the on-delay circuit 8 becomes a low level logic value 0, and hence a signal indicating motor rotation stopped (safe side) is not generated.

Here, even if the high frequency signal generator SG connected to the first transformer $T_1$, and the signal processing circuit 7 connected to the second transformer $T_2$, are interchanged, motor rotation stop, and poor contact of the excitation contact points can still be detected.

FIG. 17 shows a circuit example for where the connections of the high frequency signal generator SG and the signal processing circuit 7 in the circuit configuration of FIG. 13 are interchanged. FIG. 18(A) and FIG 18(B) show respective circuit connection conditions for when normal, and at the time of poor contact.

An impedance Zn3 for when normal in the case of FIG. 18(A), as seen from the winding $N_3$ becomes as follows:

$$Zn3 \approx (2jwL + 2X) \times (N_3/2N)^2 \qquad (7)$$

Moreover, an impedance Zf3 in FIG. 18(B) at the time of poor contact of the excitation contact points $r_{2a}$ becomes as follows:

$$Zf3 \approx [2jwL + X + ZA \times (Nb/Na)^2] \times (N_3/N)^2 \qquad (8)$$

Since clearly $|Zn3| < |Zf3|$, then in the same way as with the beforementioned respective poor contact detection circuits, the poor contact of the excitation contact points $r_{2a}$ can be detected. With the circuit configuration of FIG. 17, as with the circuit of FIG. 15, detection of poor contact of the excitation contact points $r_{2c}$ is difficult. However, since at the time of poor contact of the excitation contact points $r_{2c}$, the signal of frequency w from the high frequency signal generator SG is no longer received, and hence the input level to the signal processing circuit 7 drops, then the output from the signal processing circuit 7 becomes a logic value 0.

FIG. 19 shows a circuit example for where the connections of the high frequency signal generator SG side and the signal processing circuit 7 side in the circuit configuration of FIG. 15 are interchanged. FIG. 20(A) and FIG. 20(B) show respective circuit connection conditions for when normal, and at the time of poor contact.

An impedance Zn4 for when normal in the case of FIG. 20(A), as seen from the winding Na becomes as follows:

$$Zn4 \approx [(3j\rho L/2) + (X/2)] \times (Na/Nb)^2 \qquad (9)$$

Moreover, an impedance Zf4 in FIG. 20(B) at the time of poor contact of the excitation contact points $r_{2a}$ becomes as follows:

$$Zf4 \approx [2j\rho L + X + rs'' \times (N/N_3)^2] \times (Na/Nb)^2 \qquad (10)$$

Since clearly $|Zn4| < |Zf4|$, then the poor contact of the excitation contact points $r_{2a}$ can be detected. The poor contact of the excitation contact points $r_{2b}$ can also be detected in the same way. Furthermore, in the case where poor contact occurs at the excitation contact points $r_{2c}$, or the excitation contact points $r_{2a}$, $r_{2b}$ both have poor contact, then $|Zf4|$ becomes a maximum, and hence this case also can be detected.

With the circuit configurations of FIG. 13, FIG. 15, FIG. 17, and FIG. 19, it will be obvious that not only can poor contact of the excitation contact points be detected but also a disconnection fault of the resistors $X_1$, $X_2$ and the transformers $T_1$, $T_2$ can be detected. Moreover, these poor contact detection circuits may also be used in the respective embodiments shown in FIG. 1, FIG. 3 and FIG. 4, as disconnection fault detection circuits for the signal input lines A~C.

FIG. 21 shows a circuit configuration of an embodiment of the present invention for where a judgment signal for verifying that motor rotation has stopped is not generated when a fault such as fusion or poor contact of the excitation contact points $r_{2a}$~$r_{2c}$ occurs. Components the same as in the beforementioned respective embodiments are indicated by the same symbols and description is omitted.

In FIG. 21, an output $P_1$ from an on-delay circuit 8, an output $P_2$ from a self hold circuit 12 such as in FIG. 10(A), an output $P_3$ from a window comparator 14 of FIG. 13, FIG. 15, FIG. 17 or FIG. 19, and an output $P_4$ due to an ON operation of a second switch SW2 based on an operation stop command, are input to a fail-safe AND gate 40' serving as a second logical product operating device, and an output Y from the AND gate 40' is made a judgment signal for verifying that motor rotation has stopped. The AND gate 40' has the same construction as the AND gate 40 shown in FIG. 4.

With such a construction, when a rotation stop command for the motor 1 occurs, then in the case where fusion or poor contact occurs at the excitation contact points $r_{2a}$~$r_{2c}$, the output $P_2$ or $P_3$ becomes a logic value 0 so that the output Y from the AND gate 40' becomes a logic value 0, and a signal of a high level indicating that rotation of the motor 1 has stopped is not generated.

Now a construction is possible where, instead of the output $P_4$ corresponding to the stop command output for the motor 1, or the second switch SW2' shown in FIG. 12, a signal is used from a current sensor as shown by the embodiment of FIG. 4, for verifying that a current is not flowing in the power supply lines u, v, w of the motor 1.

An embodiment of this construction will be described with reference to FIG. 22. Components the same as for the beforementioned respective embodiments are indicated by the same symbols and description is omitted.

In FIG. 22, the current sensors 20, 30 of FIG. 4 are provided for two, for example power supply lines u, w, of the three power supply lines u, v, w of the motor 1, in the same way as in FIG. 4.

With the circuit of this embodiment, the outputs from the two current sensors 20, 30 are input to an AND gate 70, and an output $P_4'$ from the AND gate 70 is input to an AND gate 40'.

The AND gate 70 is a fail-safe device having the same construction as the AND gate 40'.

With such a construction, during operation of the motor 1, a current flows in either or both of the power supply lines u, w, and hence the output $P_4'$ from the AND gate 70 becomes a logic value 0. When the operation of the motor 1 stops, a current does not flow in either of the power supply lines u, w, and hence the output $P_4'$ from the AND gate 70 becomes a logic value 1. Consequently, the output Y from the AND gate 40' can be kept from becoming a logic value 1 until the operation of the motor 1 has stopped and there is no current flowing in the power supply lines u, w.

FIG. 23 shows an embodiment for where photocouplers having photo-MOS field effect transistors (referred to hereunder as a photo MOSFET) combined with a light emitting diode, are used as second switching elements. Elements the same as in the embodiment of FIG. 8 are indicated by the same symbols and description is omitted.

In FIG. 23, instead of the excitation contact points $r_{2a}, r_{2b}, r_{2c}$, photo MOSFETs 63a, 63b, 63c are inserted in series in the signal input lines A, B, C of the sensor section 3'. Furthermore, a light emitting diode 62 which together with the photo MOSFETs 63a, 63b, 63c makes up a photocoupler, is connected in series via a resistor 61 between a second switch SW2 which is linked with a first switch SW1, and earth.

With such a construction, when the first switch SW1 is switched off due to a motor drive stop command, the second switch SW2 is switched on and the light emitting diode 62 emits light. Due to the light from the light emitting diode 62, the photo MOSFETs 63a, 63b, 63c conduct (come on), connecting the sensor section 3' to the power supply lines u, v, w of the motor 1, thus making up a closed circuit for verifying that rotation of the motor 1 has stopped.

With the embodiments of FIG. 21 and FIG. 22, in the case of a construction where a load is driven via a pulley belt, an optical sensor 52 as shown in FIG. 5 for detecting the presence of the pulley belt may be provided, with the output from the optical sensor 52 input to an AND gate 40'.

Next is a description for the case where the motor stopped verification sensor of the present invention is applied to the change completion detection circuit given in PCT/JP96/00585.

First is a brief description of the change completion detection circuit.

With a device where there is a first condition and second condition for a detection object, then a basic construction for the change completion detection circuit, as shown in PCT/JP96/00585 (FIG. 1), comprises a detection device, a first condition detection circuit, a second condition detection circuit, and a condition judgment circuit.

With the operation, the first condition detection circuit generates an output signal corresponding to the first condition, while the second condition detection circuit generates an output signal corresponding to the second condition, based on an output signal from the detection device corresponding to the operating condition of the detection object. In detecting completion of a change from the first condition to the second condition, the condition judgment circuit outputs an output signal corresponding to the second condition of the second condition detection circuit as a change completion judgment signal under the condition that there is a period where the output signals from the respective first and second condition detection circuits are simultaneously overlapped.

If the detection object is a rotating body such as a motor, then with a circuit for detecting completion of change from rotation (first condition) to low speed and stopped (second condition), as shown in PCT/JP96/00585 (FIG. 4), the first condition detection circuit is a rotation present detection circuit, the second condition detection circuit is a low speed rotation detection circuit, while the condition judgment circuit is a rotation stopped judgment circuit. The signal output from the detection circuit is made a signal of a frequency corresponding to the rotational speed of the rotating body. In this case, the signal frequency of the detection circuit is proportional to the rotational speed of the rotating body, and becomes zero when the rotating body stops. Moreover, the rotation present detection circuit generates an output of logic value 1 corresponding to a high level when the rotating body is rotating, while the low speed rotation detection circuit generates an output of logic value 1 when the signal frequency of the detection circuit is equal to or less than a predetermined value. Generally, since the rotating body gradually decelerates and then stops, then when normal, the signal frequency of the detection circuit gradually drops to zero. Consequently after the signal frequency of the detection circuit has dropped to or below a predetermined value, the rotation speed does not become zero for some time. Therefore, when normal there is a period where the outputs from the rotation present detection circuit and the low speed rotation detection circuit both become logic value 1.

With the motor stopped verification sensor of the present invention, a signal of a frequency corresponding to the rotational speed of the motor is generated from a rectifying circuit 5 inside the signal processing circuit 7. Consequently, the output signal from the rectifying circuit 5 can be used as the signal from the detection circuit for the change completion detection circuit shown in PCT/JP96/00585.

An example of an application of a sensor according to the present invention to a change completion detection circuit is illustrated below.

FIG. 24 shows a circuit diagram for the case where the embodiment circuit of FIG. 1 is applied.

In FIG. 24, the window comparator 6 of the signal processing circuit 7 and the on-delay circuit 8, both of the embodiment circuit of FIG. 1, are removed and the output from the rectifying circuit 5 is input to a rotation present detection circuit 101 and a low speed rotation detection circuit 102. A rotation stopped judgment circuit 103 generates a rotation stopped judgment output signal Z based on the outputs from the two detection circuits 101, 102. In the figure, J1, J2 indicate signal lines, while SA, SB indicate respective output signals from the rotation present detection circuit 101 and the low speed rotation detection circuit 102.

With such a construction, during rotation of the motor 1, an output signal SA=1 is generated from the rotation present detection circuit 101. When the operating switch SW is switched off, power supply to the motor 1 is cut off. After this, the motor 1 rotates under inertia, and when the rotational speed due to inertia slows to a predetermined value or less, the output signal from the low speed rotation detection circuit 102 becomes SB=1. At this time the output signal from the rotation present detection circuit 101 is still SA=1. Then, when the rotational speed of the motor 1 drops to practically zero, the output signal from the rotation present detection circuit 101 becomes SA=0. An output signal Z=1 is then generated from the rotation stopped judgment circuit 103, based on the output signal SB=1 from the low speed rotation detection circuit 102, advising that rotation of the motor 1 has stopped.

In this way, an output signal Z=1 is generated based on the output signal SB=1 from the low speed rotation detection circuit 102, on the proviso that the output signals from the two detection circuits 101, 102 have simultaneously been a logic value 1.

FIG. 25 shows a circuit diagram for the case where the embodiment circuit of FIG. 3 is applied.

In FIG. 25, a signal from a contact point b of a switch over switch SW' is input to a rotation stopped judgment circuit 103. The signal from the contact point b becomes a logic value 0 at the point in time when power is supplied to the motor 1 (the point in time when the motor 1 starts rotating), and becomes a logic value 1 from the point in time when power to the motor 1 is cut off (the point in time when the motor 1 starts inertial rotation). Consequently, the signal from the contact point b can be used as the signal OP for the change completion detection circuit shown in PCT/JP96/00585. Now in this case, the voltage Vc applied to the switch over switch SW' is a voltage higher than the power source voltage Vcc of a logical product circuit 105 (to be described later) of the rotation stopped judgment circuit 103.

With such a construction, when a current flowing to the motor 1, an output signal Z=1 indicating that the motor has stopped is never generated from the rotation stopped judgment circuit 103.

FIG. 26 is a circuit diagram for where the embodiment circuit of FIG. 4 of the present invention is applied. The construction here is such that the current in the power supply line to the motor 1 is monitored by a current sensor instead of the switch over switch SW'.

In FIG. 26, instead of the signal from the contact point b of the switch over switch SW', the logical product output of the two current sensors 20, 30 produced by an AND gate 104 is input to the rotation stopped judgment circuit 103 as the signal OP.

This case also has the same effect as the embodiment of FIG. 25.

FIG. 27 shows a circuit diagram of where the embodiment example of FIG. 8 of the present invention is applied. The construction here is such that the sensor portion is reliably insulated at the time of motor power supply.

With the circuit configuration of FIG. 27 however, immediately after commencement of power supply to the motor 1, the excitation contact points $r_{2a}$, $r_{2b}$, $r_{2c}$ go off so that the secondary side output from the second transformer $T_2$ becomes a zero frequency. There is thus the possibility of a rotation stopped judgment output signal of Z=1 being produced and continuing to be produced.

Therefore, with the circuit of this embodiment, a level detection circuit 107 (to be described hereunder) for judging an output level from a rectifying circuit 5, is provided in a low speed rotation detection circuit 102, and an output signal Z=1 indicating rotation stopped, is produced from a rotation stopped judgment circuit 103 based on an output of logic value 1 from the level detection circuit 107.

That is to say, when the excitation contact points $r_{2a}$, $r_{2b}$, $r_{2c}$ go off, the level of the secondary side output from the second transformer $T_2$ becomes zero, so that the output from the level detection circuit 107 becomes a logic value 0, and the output signal from the rotation stopped judgment circuit 103 becomes Z=0. Consequently at the time of driving of the motor 1, the output signal from the rotation stopped judgment circuit 103 always becomes Z=0.

A lower limit threshold value is provided in the level detection circuit 107 so that when the excitation contact points $r_{2a}$, $r_{2b}$, $r_{2c}$ come on and the inertial rotation of the motor 1 is monitored, the output level from the secondary side of the second transformer $T_2$ is always equal to or above a predetermined value. The lower limit threshold value may be set between a minimum level of an output e1 from the rectifying circuit 5, and a zero level.

In order to avoid the continuous generation of an output signal Z=1, then instead of providing the level detection circuit 107, the construction may be as shown in FIG. 28.

More specifically, excitation contact points $r_{2d}$ which are switched on and off in synchronous with the excitation contact points $r_{2a}$, $r_{2b}$, $r_{2c}$ are provided in the relay RL2, and a voltage Vc is input as a signal OP to a rotation stopped judgment circuit 103 via the excitation contact points $r_{2d}$.

Furthermore, instead of providing the excitation contact points $r_{2d}$, the construction may be such that, as shown in FIG. 29, a voltage Vc is input as a signal OP to the rotation stopped judgment circuit 103 via the switch SW2' shown in FIG. 12.

In the case of a construction where, as with the embodiment circuit of FIG. 22, the current of the power supply lines is monitored with current sensors 20, 30, the construction may be such that, as shown in FIG. 30, an output signal $P_4'$ from an AND gate 70 is input as a signal OP to the rotation stopped judgment circuit 103.

The output signal $P_3$ from the poor contact detection circuits shown in FIG. 13, FIG. 15, FIG. 17 and FIG. 19, becomes a logic value 0 when the excitation contact points $r_{2a}$, $r_{2b}$, $r_{2c}$ are all off, and becomes a logic value 1 when the excitation contact points $r_{2a}$, $r_{2b}$, $r_{2c}$ are all on. Consequently, while accelerating and rotating, the output becomes $P_3$=0, while when accelerating and stopped, the output becomes $P_3$=1. Therefore the output $P_3$ may be input as the signal OP to the rotation stopped judgment circuit 103.

FIG. 31 shows a basic example of a rotation present detection circuit 101, a low speed rotation detection circuit 102, and a rotation stopped judgment circuit 103. FIG. 31 is an example from the case where the signal OP shown in FIG. 25, FIG. 26, and FIG. 28 through FIG. 30 is used. FIG. 31 shows an arrangement where, in consideration of a disconnection fault in a signal line J2, a circuit is added as shown by the dotted line in the figure, for superimposing a high frequency signal f from a signal generator SG2 onto the signal e1 from the rectifying circuit 5.

In FIG. 31, the signal e1 from the rectifying circuit 5 is input to the low speed rotation detection circuit 102 via the capacitor $C_{11}$. Furthermore, the signal f from the signal generator SG2 is also supplied to the low speed rotation detection circuit 102. The signal e1 is amplified by an amplifier A2, and the resultant amplified signal k1 is supplied to a rectifying circuit RC2 and to the rotation present detection circuit 101.

The signal f superimposed on the signal e1 is almost completely suppressed when the signal e1 changes in accordance with the rotation, while the signal e1 is amplified and then output. A coupling capacitor $C_{12}$ of a rectifying circuit RC2 has a large capacity, while a capacitor $C_{13}$ has a small capacity with a low impedance relative to the high frequency signal f. Consequently, the rectifying circuit RC2 outputs a signal k2 with the wave form of the input signal k1 approximately maintained and the DC level shifted by the amount of the power source voltage Vcc.

A level detection circuit LV1 has a threshold value, and produces a high level signal k4 if the signal k2 is equal to or above the threshold value. An on-delay circuit OND produces a high level output signal k5 when a high level continuous time of the signal k4 becomes or exceeds a set period. When the rotational speed of the motor 1 is higher than a predetermined speed, the high level continuous time of the signal k4 is approximately the same as for the signal e1 which is shorter than the beforementioned set period, and hence a signal k5 is not generated. When the rotational speed of the motor 1 becomes lower than a predetermined speed so that the high level continuous time of the signal k4 becomes equal to or greater than the beforementioned set period, then the signal k5 is produced.

The signal k5 is input to a level detection circuit LV2 via an on-delay circuit comprising a diode $D_{13}$ and a capacitor $C_{14}$. The off-delay circuit is provided so that once the high level signal k5 is produced, a signal k6 is maintained at a high level for a predetermined time, even if the signal k5 again becomes a low level. That is to say, once the signal k5 has attained a high level, there is a time where the output is extinguished. During this time the signal k6 is maintained at a high level by the off-delay circuit. The signal k6 corresponds to an output signal SB from the low speed rotation detection circuit 102.

The level detection circuit LV2 is provided so as to make the output load resistance of the off-delay circuit larger than in the beforementioned case where the off-delay circuit was connected directly to the logical product circuit 105. In the case where the capacitor $C_{14}$ can be made sufficiently large, then the output from the off-delay circuit may be input directly to the logical product circuit 105.

The component of the signal f which is included in the signal k1 input to the rotation present detection circuit 101, is attenuated by a low pass filter comprising a resistor $R_4$ and a capacitor $C_{15}$. A signal k3 obtained after passing through the low pass filter, is input to a level shift circuit (rising differential circuit) comprising a capacitor $C_{16}$ and a resistor $R_5$, and then input to a self hold circuit 106 as a trigger input signal of a higher level than the power source voltage Vcc. This trigger input signal corresponds to an output signal SA from the rotation present detection circuit 101.

When the motor 1 is stopped, the signal e1 does not change and hence the high frequency signal f is amplified as the signal k1. At this time, the output signal SA (trigger input signal) must not be produced. To ensure this, the high frequency signal f component of the signal k1 is attenuated by the low pass filter comprising the resistor $R_4$ and the capacitor $C_{15}$, so that it is not output as a trigger input signal.

The rotation stopped judgment circuit 103 comprises the self hold circuit 106 and the logical product circuit 105. The logical product circuit 105 outputs a high level output signal to the self hold circuit 106 only when the signal k6 and an output signal OP are both high level signals. With the self hold signal 106, under conditions where a high level signal from the logical product circuit 105 is being input as a reset input signal, then if a trigger input signal is input from the rotation present detection circuit 101, a high level signal k8 is produced. Consequently since when power is being supplied to the motor 1, the signal OP becomes a low level, then the output from the logical product circuit 105 becomes a low level, and the self hold circuit 106 also becomes a low level. Only when the signal OP is a high level with power not being supplied to the motor 1, does the self hold circuit 106 produce a high level signal k8 due to input of a trigger input signal. The signal k8 corresponds to the rotation stopped judgment signal Z.

The signal f output from the high frequency signal generator SG has the role of a disconnection checking signal for the signal line J2. The low speed rotation detection circuit 102, produces an output signal SB=1 only when a component of the signal f is being input. If a disconnection fault occurs in the signal line J2, then the signal f is not input to the low speed rotation detection circuit 102, and hence the signal SB=1 is not produced.

In the case of the embodiment circuit of FIG. 27, then as mentioned before, since immediately after recommencement of power supply to the motor 1, the excitation contact points $r_{2a}$, $r_{2b}$, $r_{2c}$ go off, there is the possibility of a rotation stopped judgment output signal Z=1 being produced and continuing to be produced. Consequently with this circuit, the beforementioned level detection circuit 107 for judging the output level of the signal e1 may be provided, with a signal A1i from the level detection circuit 107 being input instead of the input signal OP for the logical product circuit 105. Moreover, as shown by the dotted line in FIG. 31, a logical product circuit 108 may be provided which produces a logical product output of the output signal A1i from the level detection circuit 107 and the signal k8, as the output signal Z from the rotation stopped judgment circuit 103.

Also with the respective embodiment circuits of FIG. 9, FIG. 10, and FIG. 21, needless to say circuit configurations are possible where these are applied to the beforementioned change completion detection circuit comprising the rotation present detection circuit 101, the low speed rotation detection circuit 102, and the rotation stopped judgment circuit 103.

By using the fail-safe window comparator/AND gate, as known for example from U.S. Pat. No. 4,661,880, and PCT Publication Nos. WO94/23303, and WO94/23496, in the logical product circuit and the level detection circuit, then a fail-safe construction can be made wherein an erroneous output signal is not produced at the time of a fault in the logical product circuit or the level detection circuit.

With the motor stopped verification sensor according to the present invention as described above, a sensor head such as an electromagnetic pick up need not be provided, and hence there is no requirement for control of the attachment position. Therefore sensor positioning is extremely simple. Moreover, maintenance and inspection costs for the motor stopped verification sensor can be reduced.

Furthermore, if switching elements which are switched off when the motor is being driven, are provided in series in the signal input lines of the sensor section, then at the time of motor drive, insulation of the sensor section from the motor power source system can be ensured. Therefore even in the case where a high frequency power source such as an inverter power source is used for the motor power source, there is no call for an increase in size and cost of the circuit elements of the sensor.

INDUSTRIAL APPLICABILITY

With the present invention, the stopping of motor rotation (including rotation under inertia) can be detected in a fail-safe manner. Moreover sensor attachment and subsequent control is simple. Hence industrial applicability is significant.

We claim:

1. A motor stopped verification sensor for verifying that a three phase AC motor has stopped rotating, said sensor comprising: a sensor section having three signal input lines for respectively connecting to three power supply lines of said three phase AC motor, said three signal input lines being connected such that a closed circuit is made up with one of the three power supply lines as a common power supply line, and the other two power supply lines connected together in parallel, and a high frequency signal of a lower level than the level of a motor drive power source is supplied to said closed circuit from one of the signal input lines for connection to said common power supply line, and a change of difference in the value of the currents respectively flowing in the other two signal input lines is sampled, wherein a motor stopped signal is output when the change of difference in the value of the currents sampled is within a predetermined range.

2. A motor stopped verification sensor according to claim 1, further comprising: a signal processing circuit for generating an output of logic value 1 corresponding to a high energy condition when a level of a signal sampled by said sensor section is within a predetermined range, and for generating an output of logic value 0 corresponding to a low energy condition when outside the predetermined range; and a first on-delay circuit for delaying the output of logic value 1 from said signal processing circuit for a predetermined time, wherein an output of logic value 1 from said first on-delay circuit is made a motor stopped judgment output, and an output of logic value 0 from said first on-delay circuit is made a judgment output indicating motor rotation, or a sensor fault.

3. A motor stopped verification sensor according to claim 2, incorporating first switching means linked to an ON operation of an operating switch for said motor, for shutting off a drive power source for said first on-delay circuit.

4. A motor stopped verification sensor according to claim 2, further comprising a pulley belt for transmitting rotation of the motor to the load, and a pulley belt presence detection sensor which generates an output of logic value 1 when said pulley belt is normal and which generates an output of logic value 0 when said pulley belt is broken; and second switching means for shutting off a drive power source for said first on-delay circuit when an output from said pulley belt presence detection sensor is a logic value 0.

5. A motor stopped verification sensor according to claim 2, further including respective current sensors which give an output of logic value 1 when a motor drive current does not flow in at least two of the three power supply lines to said motor, and which give an output of logic value 0 when a motor drive current does flow in at least two of the three power supply lines; and first logical product operating means for carrying out a logical product operation on the outputs from said respective current sensors and the output from said first on-delay circuit, wherein an output of logic value 1 from said first logical product operation means is a motor stopped judgment output, and an output of logic value 0 is a judgment output indicating motor rotation or a sensor fault.

6. A motor stopped verification sensor according to claim 5, further comprising a pulley belt for transmitting rotation of the motor to the load, and a pulley belt presence detection sensor which generates an output of logic value 1 when said pulley belt is normal and which generates an output of logic value 0 when said pulley belt is broken, wherein an output from said pulley belt presence detection sensor is input to said first logical product operating means.

7. A motor stopped verification sensor according to claim 4, where said pulley belt presence detection sensor is a reflection type optical sensor comprising: a light projector for projecting a light beam towards said pulley belt, and a light receiver which generates an output of logic value 1 when reflected light of said light beam from said pulley belt is received thereby.

8. A motor stopped verification sensor according to claim 5, further including disconnection fault detection means which gives an output of logic value 1 when the signal input lines of said sensor section are normal, and which gives an output of logic value 0 at the time of a disconnection fault, wherein an output from said disconnection fault detection means is input to said first logical product operating means.

9. A motor stopped verification sensor according to claim 1, further including respective first switching elements disposed respectively in series in said three power supply lines, and respective second switching elements disposed respectively in series in the signal input lines connected to said other two power supply lines, as well as switching element control means for outputting an on/off drive signal between said first switching elements and said second switching elements to create a relationship between said first and second switching elements such that, generally, when said first switching elements are switched on, said second switching elements are switched off.

10. A motor stopped verification sensor according to claim 9, wherein said switching element control means comprises a second on-delay circuit further including an on-delay circuit for inputting to said second switching element an on-drive signal output toward said second switching element from said switching control means with a delay of a predetermined period of time.

11. A motor stopped verification sensor according to claim 9, wherein said switching element control means comprises a third switching means for shutting off a drive power source supply to said first on-delay circuit, when said first switching elements are switched on.

12. A motor stopped verification sensor according to claim 9, further including an OFF fault detection means which gives an output of logic value 1 when said second switching elements are normal, and which gives an output of logic value 0 at the time of an OFF fault; and a second logical product operating means for carrying out a logical product operation on an output from said OFF fault detection means an output from said first on-delay circuit, wherein an output of logic value 1 from said second logical product operating means is a motor stopped judgment output.

13. A motor stopped verification sensor according to claim 12, wherein an output from said current sensor is input to said second logical product operating means.

14. A motor stopped verification sensor according to claim 9, wherein said first and second switching elements comprise respective excitation contact points of first and second electromagnetic relays, and said switching element control means comprises; a first switch connected in series to a power line of said first electromagnetic relay, and a second switch connected in series to a power supply line of said second electromagnetic relay and linked with said first switch so as to have a relationship such that, generally, when said first switch is switched on, said second switch is switched off.

15. A motor stopped verification sensor according to claim 14, further including, between said second switch of said switching element control means and said second electromagnetic relay, an on-delay circuit for inputting to said second electromagnetic relay an on-drive signal for said second electromagnetic relay generated with an on-operation of said second switch with a delay of a predetermined period of time.

16. A motor stopped verification sensor according to claim 14, wherein at the time of a fusion fault of the excitation contact points of said second electromagnetic relay, the power supply to the motor is subsequently interrupted.

17. A motor stopped verification sensor according to claim 16, wherein said second electromagnetic relay comprises a forced operation type electromagnetic relay having first and second non excitation contact points linked with the excitation contact points disposed in said signal input lines, so as to have a mutually complementary relationship such that the non excitation contact points are off when the excitation contact points are on, and further including a self hold circuit having a trigger terminal and a reset terminal connected to said second switch, which generates an output when the input signals to both terminals are both a logic value 1 corresponding a high energy condition, which self holds the input signal to said trigger terminal with said output to thereby excite said second electromagnetic relay, sand said first non excitation contact points are connected in series between said second switch and the trigger terminal of said self hold circuit, and said second non excitation contact points are connected in series to the power supply line of said first electromagnetic relay.

18. A motor stopped verification sensor according to claim 17, wherein said first electromagnetic relay comprises a forced operation type electromagnetic relay having non excitation contact points linked with the excitation contact points disposed in said power supply lines, so as to have a mutually complementary relationship such that the non excitation contact points are off when the excitation contact points are on, and moreover the non excitation contact points of said first electromagnetic relay are connected in series to said second electromagnetic relay.

19. A motor stopped verification sensor according to claim 17, wherein said second on-delay circuit is disposed between said second switch and the reset terminal of said self hold circuit.

20. A motor stopped verification sensor according to claim 14, wherein at the time of a fusion fault of the excitation contact points of said first electromagnetic relay, the connection of said power supply line and said sensor portion is subsequently interrupted.

21. A motor stopped verification sensor according to claim 20, wherein said first electromagnetic relay comprises a forced operation type electromagnetic relay having non excitation points linked with the excitation contact points disposed in said power supply lines, so as to have a mutually complementary relationship such that the non excitation contact points are off when the excitation contact points are on, and moreover the non excitation contact points of said first electromagnetic relay are connected in series to said second electromagnetic relay.

22. A motor stopped verification sensor according to claim 21, wherein said second electromagnetic relay comprises a forced operation type electromagnetic relay having non excitation points linked with the excitation contact points disposed in said signal input lines, so as to have a mutually complementary relationship such that the non excitation contact points are off when the excitation contact points are on, and the non excitation contact points of said second electromagnetic relay are disposed in the power supply line to said first electromagnetic relay.

23. A motor stopped verification sensor according to claim 1, wherein said sensor section comprises: a high frequency signal generator for generating said high frequency signal, a first transformer, and a second transformer, wherein said high frequency signal generator is connected to a primary winding of said first transformer and supplies said high frequency signal to said primary winding of said first transformer;

and wherein a second winding of said first transformer has one end connected to the common power supply line by means of said signal input line, and another end connected between first and second primary windings of said second transformer which are connected in series to each other, said second transformer having one end of the first primary winding connected to one of said two power supply lines via a first resistor by means of another signal input line, and one end of the second primary winding being connected to the other of said two power supply lines via a second resistor by means of the remaining signal input line, and a signal corresponding to a difference in the values of the respective currents flowing in the first primary winding and the second primary winding being sampled by a secondary winding and generated as an output signal of the sensor.

24. A motor stopped verification sensor according to claim 2, wherein said signal processing circuit comprises: an amplifier for amplifying an output from the sensor section, an envelope detection circuit for envelope detection of the output from said amplifier, and a window comparator which generates an output of logic value 1 when an output level from said envelope detection circuit is within a predetermined range, and which generates an output of logic value 0 when outside the predetermined range.

25. A motor stopped verification sensor according to claim 24, wherein a parallel circuit of a resistor and capacitor is provided between said envelope detection circuit and said window comparator.

26. A motor stopped verification sensor according to claim 25, wherein said capacitor is a four terminal capacitor.

27. A motor stopped verification sensor according to claim 1, comprising: a rotation present detection circuit which generates an output signal of a high level when, based on an output signal from said sensor section of a frequency corresponding to motor rpm, said frequency is higher than a predetermined value; a low speed rotation detection circuit which generates an output signal of a high level when a frequency of said output signal from said sensor section is equal to or less than a predetermined value; and a rotation stopped judgment circuit which generates an output signal of a high level indicating that rotation has stopped, under conditions where there is a period were output signals of a high level are simultaneously generated from both detection circuits.

28. A motor stopped verification sensor according to claim 27, wherein said rotation stopped judgment circuit is able to generate an output signal of a high level indicating that rotation has stopped, only when power is not being supplied to said motor.

\* \* \* \* \*

UNITED STATES PATENT AND TRADEMARK OFFICE
CERTIFICATE OF CORRECTION

PATENT NO. : 5,905,354
DATED : May 18, 1999
INVENTOR(S) : Koichi FUTSUHARA et al.

It is certified that error appears in the above-identified patent and that said Letters Patent is hereby corrected as shown below:

In Claim 12, column 28, line 19, after "means", insert --and-.

In Claim 14, column 28, line 29, "comprises;" should read --comprises:".

In Claim 17, column 28, line 61, "sand" should read --and--.

In Claim 21, column 29, line 20, after "excitation" (first occurrence), insert --contact--.

In Claim 21, column29, line 25, "connected in series" should read --disposed in the power supply line--.

In Claim 22, column 29, line 30, after "excitation" (first occurrence), insert --contact--.

Signed and Sealed this

Twentieth Day of June, 2000

*Attest:*

Q. TODD DICKINSON

*Attesting Officer*  *Director of Patents and Trademarks*